(12) United States Patent
Drechsler et al.

(10) Patent No.: US 12,028,337 B2
(45) Date of Patent: Jul. 2, 2024

(54) TECHNIQUES FOR TOKEN PROXIMITY TRANSACTIONS

(71) Applicant: Visa International Service Association, San Francisco, CA (US)

(72) Inventors: Kyle Joseph Drechsler, San Francisco, CA (US); Christopher Jones, Greenbrae, CA (US); Gayathri Venkat, Austin, TX (US); Gavin Shenker, Los Angeles, CA (US); Raul Leyva, Round Rock, TX (US); Janardana Sarma, Foster City, CA (US); Phillip Lavender, Foster City, CA (US); Leila Movahedian, Foster City, CA (US); Pinesh Roy, Foster City, CA (US); Eduardo Lopez, Menlo Park, CA (US)

(73) Assignee: Visa International Service Association, San Francisco, CA (US)

( * ) Notice: Subject to any disclaimer, the term of this patent is extended or adjusted under 35 U.S.C. 154(b) by 570 days.

(21) Appl. No.: 17/282,375

(22) PCT Filed: Oct. 8, 2019

(86) PCT No.: PCT/US2019/055233
§ 371 (c)(1),
(2) Date: Apr. 1, 2021

(87) PCT Pub. No.: WO2020/076854
PCT Pub. Date: Apr. 16, 2020

(65) Prior Publication Data
US 2021/0344672 A1    Nov. 4, 2021

Related U.S. Application Data

(60) Provisional application No. 62/816,752, filed on Mar. 11, 2019, provisional application No. 62/813,686, (Continued)

(51) Int. Cl.
*H04L 29/00* (2006.01)
*G06Q 20/02* (2012.01)
(Continued)

(52) U.S. Cl.
CPC ......... *H04L 63/0853* (2013.01); *G06Q 20/02* (2013.01); *G06Q 20/202* (2013.01);
(Continued)

(58) Field of Classification Search
CPC .............. H04L 63/0853; H04L 9/3213; H04L 63/0807; H04L 63/0838; H04L 63/0861;
(Continued)

(56) References Cited

U.S. PATENT DOCUMENTS 5,280,527 A   1/1994 Gullman
5,613,012 A   3/1997 Hoffman
(Continued)

FOREIGN PATENT DOCUMENTS

EP   1028401 A2   8/2000
EP   2156397 A1   2/2010
(Continued)

OTHER PUBLICATIONS

EP19870317.5, "Office Action", dated Mar. 2, 2023, 5 pages.
(Continued)

*Primary Examiner* — Don G Zhao
(74) *Attorney, Agent, or Firm* — Kilpatrick Townsend & Stockton LLP

(57) ABSTRACT

Systems and methods are provided to enable a user to conduct a transaction using their credentials stored on a secure server computer (e.g., a computer associated with a partner such as another merchant) by merely presenting their authentication data at a physical location via an auxiliary device. An auxiliary device may be provided for interfacing with a partners backend server (e.g., the secure server
(Continued)

computer). In some embodiments, biometric authentication may provide a mechanism for a true seamless and potentially frictionless (in the case of modalities that do not require physical contact) interaction. Payment can occur without any need for a card, phone, wearable, or any other user device as long as the auxiliary device is able to recognize the user and retrieve a credential that can be linked to that user.

20 Claims, 18 Drawing Sheets

Related U.S. Application Data filed on Mar. 4, 2019, provisional application No. 62/742,818, filed on Oct. 8, 2018.

(51) Int. Cl.
  *G06Q 20/20*  (2012.01)
  *G06Q 20/38*  (2012.01)
  *G06Q 20/40*  (2012.01)
  *H04L 9/32*  (2006.01)
  *H04L 9/40*  (2022.01)
  *G06Q 20/32*  (2012.01)
  *H04W 12/06*  (2021.01)

(52) U.S. Cl.
  CPC ..... *G06Q 20/3821* (2013.01); *G06Q 20/3829* (2013.01); *G06Q 20/385* (2013.01); *G06Q 20/401* (2013.01); *G06Q 20/40975* (2013.01); *H04L 9/3213* (2013.01); *H04L 63/0807* (2013.01); *H04L 63/0838* (2013.01); *H04L 63/0861* (2013.01); *G06Q 20/204* (2013.01); *G06Q 20/327* (2013.01); *H04W 12/06* (2013.01)

(58) Field of Classification Search
  CPC .. G06Q 20/02; G06Q 20/202; G06Q 20/3821; G06Q 20/3829; G06Q 20/385; G06Q 20/401; G06Q 20/40975; G06Q 20/204; G06Q 20/327; G06Q 20/3226; H04W 12/06
  See application file for complete search history.

(56) References Cited

U.S. PATENT DOCUMENTS

| | | |
|---|---|---|
| 5,781,438 A | 7/1998 | Lee |
| 5,883,810 A | 3/1999 | Franklin |
| 5,930,767 A | 7/1999 | Reber |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem |
| 6,453,301 B1 | 9/2002 | Niwa |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |

(56) References Cited

U.S. PATENT DOCUMENTS

| | | |
|---|---|---|
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,132,723 B2 | 3/2012 | Hogg et al. |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,528,067 B2 | 9/2013 | Hurry et al. |
| 8,533,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,751,642 B2 | 6/2014 | Vargas |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 8,924,297 B2 | 12/2014 | Kumnick et al. |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,011 B2 | 12/2016 | French |
| 9,530,137 B2 | 12/2016 | Weiss |
| 9,646,303 B2 | 5/2017 | Karpenko |
| 9,680,942 B2 | 6/2017 | Dimmick |
| 10,242,357 B1* | 3/2019 | Dorogusker ....... G06Q 20/3229 |
| 10,318,952 B1* | 6/2019 | Wade ................. G06Q 20/204 |
| 10,373,149 B1* | 8/2019 | Sather ............... G06Q 20/409 |
| 10,475,024 B1* | 11/2019 | Behren ............... G06Q 20/204 |
| 10,581,611 B1* | 3/2020 | Osborn ........... G06K 19/07309 |
| 10,878,402 B1* | 12/2020 | Blackie .............. G06Q 20/204 |
| 10,997,583 B1* | 5/2021 | Blackie ................ G07F 9/001 |
| 11,087,301 B1* | 8/2021 | Razaghi ........... G06Q 20/353 |
| 11,195,159 B1* | 12/2021 | Alkasimi .............. B64D 11/00 |
| 11,514,437 B1* | 11/2022 | Jarosch ........... G06Q 20/38215 |
| 11,636,468 B1* | 4/2023 | Jarosch ............... G06Q 20/385 |
| | | 705/76 |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0096570 A1* | 7/2002 | Wong ............... G06K 19/07703 |
| | | 235/494 |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0151353 A1* | 8/2004 | Topping ............... G06F 3/03543 |
| | | 382/124 |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0236632 A1 | 11/2004 | Maritzen |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |

(56) References Cited

U.S. PATENT DOCUMENTS

| | | |
|---|---|---|
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0128513 A1* | 6/2008 | Hammad ............ G06Q 20/325 235/492 |
| 2008/0201264 A1 | 8/2008 | Brown |
| 2008/0201265 A1 | 8/2008 | Hewton |
| 2008/0203152 A1* | 8/2008 | Hammad ............ G06Q 20/409 235/380 |
| 2008/0203170 A1* | 8/2008 | Hammad ............ G06Q 20/20 705/64 |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2011/0314539 A1* | 12/2011 | Horton ............ H04W 12/30 726/20 |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0136732 A1* | 5/2012 | McMillen ............ G06Q 20/105 705/16 |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1* | 9/2012 | Wilson ............ G06Q 20/3226 705/67 |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |

(56) References Cited

U.S. PATENT DOCUMENTS

| | | |
|---|---|---|
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226802 A1 | 8/2013 | Hammad |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1* | 2/2014 | Fort ............... H04L 63/18 713/182 |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0249945 A1 | 9/2014 | Gauthier |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1* | 1/2015 | Dill ............... G06Q 20/385 705/44 |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0066768 A1* | 3/2015 | Williamson ........ G06Q 20/405 705/44 |
| 2015/0081544 A1 | 3/2015 | Wong et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1* | 5/2015 | Powell ............... G06Q 20/382 705/67 |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0295921 A1 | 10/2015 | Cao |
| 2015/0312038 A1 | 10/2015 | Palanisamy |
| 2015/0319158 A1 | 11/2015 | Kumnick |
| 2015/0324736 A1 | 11/2015 | Sheets |
| 2015/0332262 A1 | 11/2015 | Lingappa |

(56) References Cited

U.S. PATENT DOCUMENTS

| | | |
|---|---|---|
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0048828 A1* | 2/2016 | Lee ............... G06Q 20/401 705/39 |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0217461 A1 | 7/2016 | Gaddam |
| 2016/0218875 A1 | 7/2016 | Le Saint et al. |
| 2016/0224976 A1 | 8/2016 | Basu |
| 2016/0224977 A1 | 8/2016 | Sabba et al. |
| 2016/0232513 A1* | 8/2016 | Purves ............... G06Q 20/36 |
| 2016/0232527 A1 | 8/2016 | Patterson |
| 2016/0239842 A1 | 8/2016 | Cash et al. |
| 2016/0253651 A1* | 9/2016 | Park ............... G06Q 20/34 705/39 |
| 2016/0269391 A1 | 9/2016 | Gaddam et al. |
| 2016/0301683 A1* | 10/2016 | Laxminarayanan ............... G06Q 20/027 |
| 2016/0308995 A1 | 10/2016 | Youdale et al. |
| 2016/0335639 A1* | 11/2016 | Merz ............... G06Q 20/4016 |
| 2016/0379208 A1 | 12/2016 | Deliwala et al. |
| 2017/0046696 A1 | 2/2017 | Powell et al. |
| 2017/0061422 A1 | 3/2017 | Castinado et al. |
| 2017/0076288 A1 | 3/2017 | Awasthi |
| 2017/0103387 A1 | 4/2017 | Weber |
| 2017/0109745 A1 | 4/2017 | Al-Bedaiwi |
| 2017/0148013 A1 | 5/2017 | Rajurkar |
| 2017/0161733 A1* | 6/2017 | Koletsky ............... G06Q 20/3829 |
| 2017/0163617 A1 | 6/2017 | Narayan |
| 2017/0163629 A1 | 6/2017 | Law |
| 2017/0186001 A1 | 6/2017 | Reed et al. |
| 2017/0200156 A1 | 7/2017 | Karpenko |
| 2017/0200165 A1 | 7/2017 | Narayan |
| 2017/0201520 A1 | 7/2017 | Chandoor |
| 2017/0220818 A1 | 8/2017 | Nagasundaram et al. |
| 2017/0221054 A1 | 8/2017 | Flurscheim |
| 2017/0221056 A1 | 8/2017 | Karpenko |
| 2017/0228723 A1 | 8/2017 | Taylor |
| 2017/0228728 A1 | 8/2017 | Sullivan |
| 2017/0236113 A1 | 8/2017 | Chitalia |
| 2017/0293914 A1 | 10/2017 | Girish |
| 2017/0295155 A1 | 10/2017 | Wong et al. |
| 2017/0337542 A1* | 11/2017 | Kim ............... G06Q 20/02 |
| 2017/0337549 A1 | 11/2017 | Wong |
| 2017/0345000 A1* | 11/2017 | Kohli ............... G06Q 30/0233 |
| 2017/0364903 A1 | 12/2017 | Lopez |
| 2017/0364914 A1 | 12/2017 | Howard |
| 2017/0373852 A1 | 12/2017 | Cassin |
| 2018/0005227 A1 | 1/2018 | Sandeløv et al. |
| 2018/0006821 A1 | 1/2018 | Kinagi |
| 2018/0063152 A1* | 3/2018 | Erich ............... H04L 63/0861 |
| 2018/0075081 A1 | 3/2018 | Chipman |
| 2018/0165680 A1 | 6/2018 | Sharma et al. |
| 2018/0247303 A1 | 8/2018 | Raj |
| 2018/0262334 A1 | 9/2018 | Hammad |
| 2018/0268399 A1 | 9/2018 | Spector |
| 2018/0268405 A1 | 9/2018 | Lopez |
| 2018/0276647 A1* | 9/2018 | Geupel ............... G06Q 20/4012 |
| 2018/0285875 A1 | 10/2018 | Law |
| 2018/0324184 A1 | 11/2018 | Kaja |
| 2018/0324584 A1 | 11/2018 | Lopez |
| 2019/0020478 A1* | 1/2019 | Girish ............... H04L 9/3231 |
| 2019/0034934 A1* | 1/2019 | Trelin ............... B60R 25/25 |
| 2019/0066069 A1 | 2/2019 | Faith |
| 2019/0080075 A1* | 3/2019 | Ekberg ............... H04L 63/10 |
| 2019/0102773 A1* | 4/2019 | Dawley ............... C06D 5/06 |
| 2019/0147439 A1 | 5/2019 | Wang |
| 2019/0356489 A1 | 11/2019 | Palanismy |
| 2019/0361901 A1* | 11/2019 | Purves ............... G06Q 20/20 |
| 2019/0384896 A1 | 12/2019 | Jones |
| 2019/0392431 A1 | 12/2019 | Chitalila |
| 2020/0013059 A1* | 1/2020 | Mariappan ............... G06Q 20/4016 |
| 2020/0052897 A1* | 2/2020 | Girish ............... H04L 9/3213 |
| 2020/0267153 A1 | 8/2020 | Kang |
| 2020/0314644 A1 | 10/2020 | Dean |
| 2021/0117988 A1* | 4/2021 | Kresge ............... G06Q 40/02 |
| 2021/0182835 A1* | 6/2021 | Kurylko ............... G06Q 20/3672 |
| 2021/0182852 A1* | 6/2021 | Sukhija ............... G06Q 20/405 |

FOREIGN PATENT DOCUMENTS

| | | |
|---|---|---|
| WO | 2000/014648 A1 | 3/2000 |
| WO | 2001035304 A1 | 5/2001 |
| WO | 2001035304 A9 | 5/2001 |
| WO | 2004/051585 A2 | 11/2003 |
| WO | 2004042536 A2 | 5/2004 |
| WO | 2005/001751 A1 | 6/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |
| WO | 2017201301 A1 | 11/2017 |
| WO | 2018125444 A1 | 7/2018 |

OTHER PUBLICATIONS

SG11202103377W , "Written Opinion", dated Feb. 13, 2023, 9 pages.

Application No. EP19870317.5 , Extended European Search Report, dated Oct. 15, 2021, 7 pages.

PCT/US2019/055233 , "International Search Report and Written Opinion", dated Apr. 10, 2020, 27 pages.

PCT/US2019/055233 , "Invitation to Pay Additional Fees and, Where Applicable, Protest Fee", dated Jan. 10, 2020, 7 pages.

\* cited by examiner

TECHNIQUES FOR TOKEN PROXIMITY TRANSACTIONS

CROSS-REFERENCE TO RELATED APPLICATIONS

This application is a National Stage of International Application No. PCT/US2019/055233, filed Oct. 8, 2019, which claims priority to U.S. Patent Application No. 62/742,818, filed on Oct. 8, 2018, U.S. Patent Application No. 62/813,686, filed Mar. 4, 2019, and U.S. Patent Application No. 62/816,752, filed Mar. 11, 2019, the disclosures of which are herein incorporated by reference in their entirety for all purposes.

BACKGROUND

A user can utilize a user device such as a mobile phone to perform transactions. A user device is used to perform a token provisioning process that enables a token to be stored at the user device. The user may cause the user device to interact with an access device, and may pass the token to the access device to conduct a transaction. During the transaction, a real credential associated with the user may replace the token during an authorization process. Separately, to perform a transaction using the user device, the user needs to authenticate himself or herself. The user may authenticate himself or herself with a personal identification number or other authentication data. Consequently, performing a transaction with a user device can involve a number of steps with is cumbersome.

In addition, physical user devices are often needed to conduct transactions at access devices. The need to have a physical user device to access a resource at an access device is also cumbersome. For example, a user may not be in possession of a physical user device when the user wants to conduct a transaction, yet may wish to conduct a transaction nonetheless.

Still further, existing physical access devices may be legacy access devices, that may not be capable of conducting transactions using tokens or credentials that originate from a source other than a user device. As such, legacy access devices may be incapable of running certain types of transactions that would otherwise be desirable to conduct.

Embodiments of this disclosure address these and other problems, individually and collectively.

SUMMARY

One embodiment of the invention is directed to a method. The method may comprise receiving, by an auxiliary device in communication with an access device, authentication data from a user. The method may further comprise initiating, by the auxiliary device, verifying the authentication data. The method may further comprise requesting, by the auxiliary device, a token from a secure server computer. The method may further comprise receiving, by the auxiliary device, the token and a transaction authentication verification value. The method may further comprise providing, by the auxiliary device, the token and the transaction authentication verification value to the access device, wherein the access device generates an authorization request message.

Another embodiment of the invention is directed to an auxiliary device. The auxiliary device may be in communication with An access device. The auxiliary may comprise a processor and a computer readable medium coupled to the processor, the computer readable medium comprising code executable by the processor to cause the auxiliary device to perform operations. The operations may comprise receiving authentication data associated with a user. The operations may further comprise verifying the authentication data. The operations may further comprise requesting a token from a secure server computer. The operations may further comprise receiving the token from the secure server computer. The operations may further comprise obtaining a verification value for the token. The operations may further comprise providing the token and the verification value to the access device, wherein the access device generates an authorization request message.

Another embodiment of the invention is directed to another method. The method may comprise receiving, by a processing network computer from an access device, an authorization request message comprising data in a first transaction data format. The method may further comprise converting, by the processing network computer, the data in the first transaction data format to a second transaction data format. The method may further comprise transmitting, by the processing network computer, an authorization request message including data in the second transaction data format to an authorizing entity computer for authorization.

Another embodiment of the invention is directed to a processing network computer comprising a processor and a computer readable medium coupled to the processor, the computer readable medium comprising code executable by the processor to cause the processing network computer to perform operations. The operations may comprise receiving an authorization request message comprising data in a first transaction data format. The operations may comprise converting the data in the first transaction data format to a second transaction data format. The operations may comprise transmitting an authorization request message including data in the second transaction data format to an authorizing entity computer for authorization.

Another embodiment of the invention is directed to another method. The method may comprise generating, by a first computer, a request for a plurality of cryptograms for transactions involving tokens. The method may comprise transmitting the request to a second computer. The method may comprise receiving, by the first computer from the second computer, the plurality of cryptograms. The method may comprise storing, by the first computer, the plurality of cryptograms for subsequent use. In some embodiments, the first computer is a token provider computer and the second computer is a secure server computer.

Another embodiment of the invention is directed to a token provider computer comprising a processor and a computer readable medium coupled to the processor, the computer readable medium comprising code executable by the processor to cause the token provider computer to perform operations. The operations may comprise receiving, from a token requestor computer, a request for a token. The operations may comprise generating the token. The operations may comprise receiving, from the token requestor computer, a cryptogram request for a number of cryptograms associated with the token. The operations may comprise obtaining profile data for a token requestor corresponding to the token requestor computer. The operations may comprise determining that the token requestor associated with the token requestor computer is authorized to pre-fetch multiple cryptograms in a single request. The operations may comprise transmitting a response with a plurality of cryptograms to the token requestor computer.

Another embodiment of the invention is directed to another method. The method may comprise receiving, by a device in communication with an access device, a token and a single use value associated with a credential of a user. The method may comprise receiving, by the device from the access device, access device data comprising at least an unpredictable value. The method may comprise generating, by the device, an authorization request cryptogram. The method may comprise transmitting, by the device, the token and the authorization request cryptogram to the access device. In some embodiments, the access device generates an authorization request message and transmits the authorization request message to an authorizing computer for authorization. In some embodiments, the device may be an auxiliary device.

Another embodiment of the invention is directed to a device comprising a processor and a computer readable medium coupled to the processor, the computer readable medium comprising code executable by the processor to cause the device to perform operations. In some embodiments, the device is in communication with an access device. The operations may comprise receiving a single use value and a token associated with a credential of a user. The operations may comprise receiving access device data comprising at least an unpredictable value. The operations may comprise generating an authorization request cryptogram. The operations may comprise transmitting the token and the authorization request cryptogram to an access device in communication with the device. In some embodiments, the access device generates an authorization request message and transmits the authorization request message to an authorizing computer for authorization. In some embodiments, the device is an auxiliary device or a secure element device.

Another embodiment of the invention is directed to another method. The method may comprise receiving, by a secure element device in communication with an auxiliary device and an access device, a token and a cryptographic key associated with a credential of a user. In some embodiments, the token and cryptographic key may be received from the auxiliary device. The method may further comprise receiving, by the secure element device from the access device, access device data comprising at least an unpredictable value. The method may further comprise generating, by the secure element device, an interaction cryptogram. The method may further comprise transmitting, by the secure element device, the token and the interaction cryptogram to the access device. In some embodiments, the access device generates an authorization request message and transmits the authorization request message to an authorizing computer for authorization.

Another embodiment of the invention is directed to a secure element device comprising a secure memory space, a processor, and a computer readable medium coupled to the processor, the computer readable medium comprising code executable by the processor to cause the secure element device to perform operations. In some embodiments, the secure element device may be in communication with an access device and an auxiliary device. The operations may comprise receiving, from the auxiliary device, a token and cryptographic key associated with a credential of a user. The operations may comprise storing the token and the cryptographic key in the secure memory space. The operations may comprise receiving access device data comprising at least an unpredictable value. The operations may comprise generating an interaction cryptogram. The operations may comprise transmitting the token and the interaction cryptogram to an access device in communication with the secure element device. In some embodiments, the access device generates an authorization request message and transmits the authorization request message to an authorizing computer for authorization.

Further details regarding embodiments of the invention can be found in the Detailed Description and the Figures.

DETAILED DESCRIPTION

Figure 1:
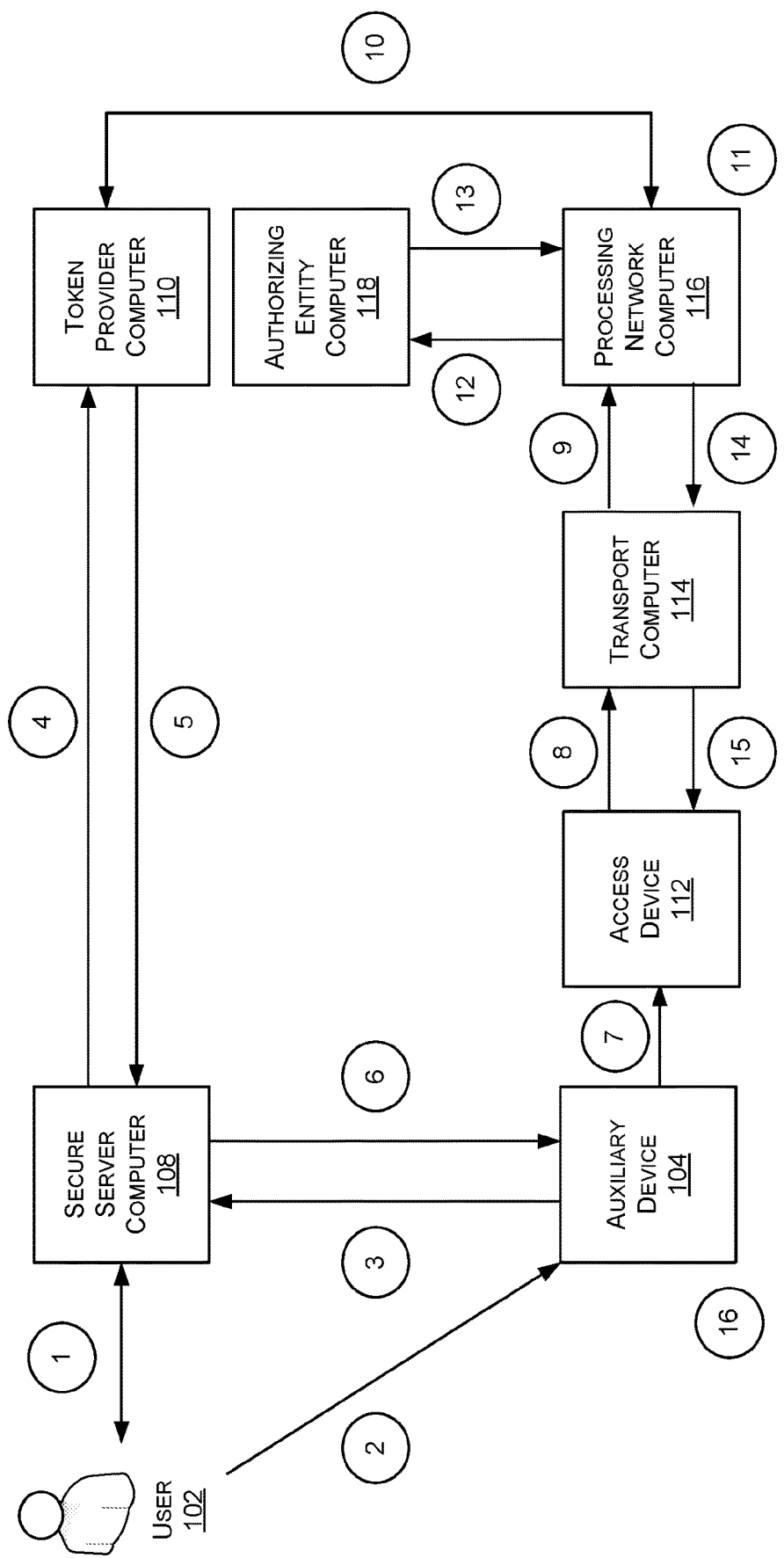
FIG. 1 shows an exemplary system and a process flow diagram, in accordance with at least one embodiment.

Prior to discussing embodiments of the invention, some terms can be described in further detail.

A "user" may include an individual or a computing device. In some embodiments, a user may be associated with one or more personal accounts and/or mobile devices. In some embodiments, the user may be a cardholder, account holder, or consumer.

A "computing device" may be any suitable electronic device that can process and communicate information to other electronic devices. The computing device may include a processor and a computer readable medium coupled to the processor, the computer readable medium comprising code, executable by the processor. The computing device may also each include an external communication interface for communicating with each other and other entities. Examples of computing devices may include user devices, access devices, mobile devices, auxiliary devices, server computers, resource provider computers, processing network computers, authorizing entity computers, transport computers, token provider computers, and the like.

A "user device" may be any suitable device operated by a user. User devices may be in any suitable form. Some examples of user devices include cellular phones, smartphones, mobile phones, payment cards, smartcards, PDAs, personal computers (PCs), tablet computers, and the like. In some embodiments, where a user device is a mobile device, the mobile device may include a display, a memory, a processor, a computer-readable medium, and any other suitable component.

A "mobile device" may comprise any suitable electronic device that may be transported and operated by a user, which may also provide remote communication capabilities to a network. A mobile device such as a mobile communication device may communicate using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

An "access device" may be any suitable device for providing access to an external computer system. An access device may be in any suitable form. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a mobile device.

An "auxiliary device" may include any suitable computing device that provides supporting functionality to a process. By way of example, an auxiliary device may provide supporting functionality to a payment process.

A "secure element device" may include any suitable computing device that includes a secure element such as secure memory. "Secure memory" refers to any suitable memory of the computing device that is protected such that processes and/or entities not allocated to the secure memory may not access the secure memory. An example of secure memory may include an enclave (e.g., memory that is encrypted and managed by a chipset of the computing device). In some embodiments, information stored in secure memory may be encrypted.

An "application" may be a computer program that is used for a specific purpose.

"Authentication data" may include any data suitable for authenticating a user or device. Authentication data may be obtained from a user or a device that is operated by the user. Examples of authentication data obtained from a user may include PINs (personal identification numbers), biometric data (e.g., fingerprint, facial scan, retina scan, etc.), passwords, etc. Examples of authentication data that may be obtained from a device may be include device serial numbers, hardware secure element identifiers, device fingerprints, phone numbers, IMEI numbers, etc.

"Access data" may include any suitable data that can be used to access a resource or create data that can access a resource. In some embodiments, access data may be account information for a payment account. Account information may include a PAN (primary account number), payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

An "access request" may include a request for access to a resource. The resource may be a physical resource (e.g., good), digital resources (e.g., electronic document, electronic data, etc.), or services. In some cases, an access request may be submitted by transmission of an access request message that includes access request data. Typically a device associated with a requestor may transmit the access request message to a device associated with a resource provider.

"Access request data" may include any information surrounding or related to an access request. Access request data may include access data. Access request data may include information useful for processing and/or verifying the access request. For example, access request data may include details associated with entities (e.g., resource provider computer, processor server computer, authorization computer, etc.) involved in processing the access request, such as entity identifiers (e.g., name, etc.), location information associated with the entities, and information indicating the type of entity (e.g., category code). Exemplary access request data may include information indicating an access request amount, an access request location, resources received (e.g., products, documents, etc.), information about the resources received (e.g., size, amount, type, etc.), resource providing entity data (e.g., resource provider data, document owner data, etc.), user data, date and time of an access request, a method utilized for conducting the access request (e.g., contact, contactless, etc.), and other relevant information. Access request data may also be known as access request information, transaction data, transaction information, or the like.

A "digital wallet" can include an electronic device that allows an individual to conduct electronic commerce transactions. A digital wallet may store user profile information, credentials, bank account information, one or more digital wallet identifiers and/or the like and can be used in a variety of transactions, such as, but not limited to, e-commerce transactions, social network transactions, money transfer/personal payment transactions, mobile commerce transactions, proximity payment transactions, gaming transactions, etc. A digital wallet may be designed to streamline the purchase and payment process. A digital wallet may allow the user to load one or more payment cards onto the digital wallet so as to make a payment without having to enter an account number or present a physical card. A provider (e.g., an entity that hosts the digital wallet) may be referred to as a "digital wallet provider."

A "biometric" may be any human characteristic that is unique to an individual. For example, a biometric may be a person's fingerprint, voice sample, face, DNA, retina, etc.

A "biometric reader" may include a device for capturing data from an individual's biometric sample. Examples of biometric readers may include fingerprint readers, front-facing cameras, microphones, and iris scanners.

A "biometric sample" may include data obtained by a biometric reader. The data may be either an analog or digital representation of the user's biometric, generated prior to determining distinct features needed for matching. For example, a biometric sample of a user's face may be image data. In another example, a biometric sample of a user's voice may be audio data.

A "biometric template" or "biometric sample template" may include a file containing distinct characteristics extracted from a biometric sample that may be used during a biometric authentication process. For example, a biometric template may be a binary mathematical file representing the unique features of an individual's fingerprint, eye, hand or voice needed for performing accurate authentication of the individual.

"Biometric data" includes data that can be used to uniquely identify an individual based upon one or more intrinsic physical or behavioral traits. For example, biometric data may include fingerprint data and retinal scan (e.g. eye scan) data. Further examples of biometric data include digital photographic data (e.g., facial recognition data), deoxyribonucleic acid (DNA) data, palm print data, hand geometry data, and iris recognition data.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

An "authorizing entity" may be an entity that authorizes a request, typically using an authorizing computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user. A computing device operated by or on behalf of an authorizing entity may be referred to as an "authorizing entity computer."

A "resource provider" can be any suitable entity that provides resources (e.g., goods, services, access to secure data, access to locations, or the like). For example, a resource providing entity can be a merchant, a payment processor, a digital wallet provider, a venue operator, a building owner, a governmental entity, etc. A "merchant" may typically be an entity that engages in transactions and can sell goods or services, or provide access to goods or services. A computing device operated by or on behalf of a resource provider may be referred to as a "resource provider computer."

A "partner" can be an entity such as a resource provider such as a merchant (or computers operated by such entities). A "partner device" can be any suitable computing device operating by or on behalf of a partner.

A "secure server computer" can be a server computer that securely stores data. As a non-limiting example, a secure server computer can be part of a partner's cloud-computing environment. A "cloud-computing environment" may include a network of one or more server computers hosted on a network (e.g., the Internet) that are utilized to store, manage, and process data.

An "acquirer" may typically be a business entity (e.g., a commercial bank) that has a business relationship with a resource provider. Some entities can perform both issuer and acquirer functions. Some embodiments may encompass such single entity issuer-acquirers. A computing device operated by or on behalf of a resource provider may be referred to as a "transport computer."

A "token provider computer" can include an electronic device that services payment tokens and/or cryptograms. In some embodiments, a token provider computer can facilitate requesting, determining (e.g., generating) and/or issuing (provisioning, transmitting, etc.) tokens and/or cryptograms, as well as maintaining an established mapping of tokens to primary account numbers (PANs) (e.g., real account identifiers) and/or cryptograms in a repository. In some embodiments, the token provider computer may establish a token assurance level for a given token to indicate the confidence level of the token to PAN binding. The token provider computer may include or be in communication with a token data store wherein the generated tokens/cryptograms are stored. The token provider computer may support token processing of payment transactions submitted using tokens by de-tokenizing the token to obtain the actual PAN. In some embodiments, a token provider computer may include a tokenization computer alone, or in combination with other computers such as a transaction processing computer. Various entities of a tokenization ecosystem may assume the roles of the token provider computer. For example, payment networks and issuers or their agents may become the token provider computer by implementing the token services according to embodiments of the present invention.

A "processing network computer" may include a server computer used for processing transactions from a network. In some embodiments, the processing network computer may be coupled to a database and may include any hardware, software, other logic, or combination of the preceding for servicing the requests from one or more client computers or user devices. The processing network computer may comprise one or more computational apparatuses and may use any of a variety of computing structures, arrangements, and compilations for servicing the requests from one or more client computers or user devices. In some embodiments, the processing network computer may operate multiple server computers. In such embodiments, each server computer may be configured to process a transaction for a given region or handles transactions of a specific type based on transaction data.

The processing network computer may include data processing subsystems, networks, and operations used to support and deliver authorization services, exception file services, and clearing and settlement services. An exemplary processing network computer may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The processing network computer may use any suitable wired or wireless network including the Internet.

The processing network computer may process transaction-related messages (e.g., authorization request messages and authorization response messages) and determine the appropriate destination computer (e.g., issuer computer/authorizing entity computer) for the transaction-related messages. In some embodiments, the processing network computer may authorization transactions on behalf of an issuer. The processing network computer may also handle and/or facilitate the clearing and settlement of financial transactions.

A "cryptographic key" (also referred to as a "key") may include a piece of information that is used in a cryptographic algorithm to transform data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "limited use key" may include a cryptographic key for which use is limited. By way of example, a limited use key may be a cryptographic key associated with a limited use threshold. A limited-use threshold may be exceeded or exhausted when an underlying condition is met. For example, a limited-use threshold may include a time-to-live that indicates an amount of time for which a piece of information (e.g., a limited use key) is valid, and once that amount of time has elapsed, the limited-use threshold is exceeded or exhausted, and the piece of information (e.g., the limited use key) may become invalid and may no longer be used. As another example, a limited-use threshold may include a number of times that a piece of information (e.g., the limited use key) can be used, and once the piece of information (e.g., the limited use key) has been used for that number of times, the limited-use threshold is exceeded or exhausted, and the piece of information (e.g., the limited use key) may become invalid and may no longer be used. A limited use key may be derived from account data of a user, and may be provided to a user device operated by a user. It may alternatively be generated by the user device.

A "cryptogram" may include an encrypted representation of some information. A cryptogram may include a token authentication verification value (TAW) associated with a token. A cryptogram can be used by a recipient to determine if the generator of the cryptogram is in possession of a proper key, for example, by encrypting the underlying information with a valid key, and comparing the result to the received cryptogram. A cryptogram may include encrypted characters. Cryptograms can be of any suitable length and may be formed using any suitable data transformation process. Exemplary data transformation processes include encryption, and encryption processes such as DES, triple DES, AES, and ECC may be used. Keys used with such encryption process can be of any appropriate length and may have any suitable characteristics. In some embodiments, a cryptogram may include encrypted token data associated with a token (e.g., a token domain, a token expiry date, etc.). In some embodiments, a cryptogram may be used to validate the token. For example, a cryptogram may be used to validate that the token is being used within a token domain and/or by a token expiry date associated with the token. In some embodiments, a cryptogram may be used in a payment process, and may be generated by a card or device with the unique derivation key (UDK) or a limited-use key (LUK) and additional information (e.g., a primary account number, token, and/or information from a chip and point-of-sale (POS)). Different types of payment cryptograms can be used in different settings.

An "interaction cryptogram" may include a cryptogram that is generated in response to an interaction between entities. In some embodiments, an interaction cryptogram may be generated using a limited-use key, an encryption algorithm, and inputs. An "ARQC" (also referred to as an authorization request cryptogram" may include a cryptogram that is generated utilizing a single use value. A "single use value" may be a value that may be used only once. In some embodiments, a single use value may be a counter, an unpredictable number, etc.

A "token domain" may indicate an area and/or circumstance in which a token can be used. Examples of the token domain may include, but are not limited to, payment channels (e.g., e-commerce, physical point of sale (POS), etc.), POS entry modes (e.g., contactless, magnetic stripe, etc.), and resource provider identifiers (e.g., merchant identifiers) to uniquely identify where the token can be used. A set of parameters (i.e. token domain restriction controls) may be established as part of token issuance by the token service provider that may allow for enforcing appropriate usage of the token in transactions. For example, the token domain restriction controls may restrict the use of the token with particular presentment modes, such as contactless or e-commerce presentment modes. In some embodiments, the token domain restriction controls may restrict the use of the token at a particular resource provider (e.g., a merchant) that can be uniquely identified. Some exemplary token domain restriction controls may require the verification of the presence of a token cryptogram that is unique to a given transaction. In some embodiments, a token domain can be associated with a token requestor.

"Token expiry date" may include the expiration date/time of the token. The token expiration date may be a numeric value (e.g. a 4-digit numeric value). In some embodiments, the token expiry date can be expressed as a time duration as measured from the time of issuance.

A "digital signature" may include the result of applying an algorithm based on a public/private key pair, which allows a signing party to manifest, and/or a verifying party to verify, the authenticity and/or integrity of a document. The signing party acts by means of the private key and the verifying party acts by means of the public key. This process certifies the authenticity of the sender, the integrity of the signed document and the so-called principle of nonrepudiation, which does not allow disowning what has been signed. A certificate or other data that includes a digital signature by a signing party is said to be "signed" by the signing party. In some embodiments, the digital signature may be performed in accordance with RSA public key cryptography.

A "master derivation key" (MDK) can be a key used to generate other keys. An MDK may be managed by an issuer of an account. MDKs may be managed on a per bank identification number (BIN) basis. The MDK may be used for card production, payment processing, etc. In some embodiments, an MDK may be managed by a processor computer that performs token management functions. Such an MDK may be used for token management and validation.

A "cryptogram generation key," (e.g., a unique derivation key (UDK)), can be a key for generating cryptograms. A cryptogram generation key may generated from an MDK, directly or by way of another key. In some embodiments, a cryptogram generation key is a per-card key. The cryptogram generation key may be stored on a chip on a card or a device (e.g. mobile phone).

A "real account identifier" may include an original account identifier associated with a payment account. For example, a real account identifier may be a primary account number (PAN) issued by an issuer fora card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

A "token" may be a substitute value for a credential. A token may be a string of numbers, letters, or any other suitable characters. Examples of tokens include payment tokens, access tokens (e.g., for accessing a location), personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "token request message" may be an electronic message for requesting a token. A token request message may include information usable for identifying a payment account (e.g., a real account identifier) or a service provider account (e.g., a digital wallet account), and/or information for generating a token (e.g., a payment token) and/or a unique cryptogram (e.g., a TAW).

A "token response message" may be a message that responds to a token request message. A token response message may include an indication that a token request was approved or denied. A token response message may also include a token (e.g., a payment token), a cryptogram (e.g., a TAVV), and/or any other suitable information.

A "cryptogram request message" may be an electronic message for requesting a cryptogram. A cryptogram request message may include information usable for identifying a payment account (e.g., a real account identifier) or a service provider account (e.g., a digital wallet account), and/or information for generating a cryptogram. A cryptogram request message may be in the same or a different format than a token request message.

A "cryptogram response message" may be a message that responds to a cryptogram request message. A cryptogram response message may include an indication that a cryptogram request was approved or denied. A cryptogram response message may include a cryptogram (e.g., a TAW), and/or any other suitable information. A cryptogram response message may be in the same or a different format than a token response message.

An "enrollment request message" may be an electronic message for requesting enrollment. An enrollment request message may be in any suitable form and may include any suitable data.

An "enrollment response message" may be a message that responds to an enrollment request message. A enrollment response message may include an indication that enrollment was successful or unsuccessful. An enrollment response message may be in any suitable form and may include any suitable data.

An "encryption key request message" may be an electronic message for requesting an encryption key. An encryption key request message may be in any suitable form and may include any suitable data.

An "encryption key response message" may be a message that responds to an encryption key request message. A enrollment response message may include an indication that enrollment was successful or unsuccessful. An enrollment response message may be in any suitable form and may include any suitable data.

The term "authentication" and its derivatives may include a process by which the credential of an endpoint (including but not limited to applications, people, devices, processes, and systems) can be verified to ensure that the endpoint is who they are declared to be.

The term "verification" and its derivatives may include a process that utilizes information to determine whether an underlying subject is valid under a given set of circumstances. Verification may include any comparison of information to ensure some data or information is correct, valid, accurate, legitimate, and/or in good standing.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a OW (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "transaction data format" may include a data format utilized for a transaction. By way of example, a transaction data format may include a format utilized for an authorization request message and/or authorization response message. In some embodiments, the transaction data format may comply with ISO 8583. Some example transaction data formats may depend on a type of transaction. By way of example, a card-on-file transaction may have the same or different data format as a card-not-present. That is a card-on-file transaction may include the same or a different set of data fields in a same or different order as a card-not-present transaction.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Embodiments can improve partner systems by providing rapid integration with a token service computer. They can provide token service integration options for partners that allow them to leverage in-store access devices such as NFC (near field communication) point of sale terminals to initiate transactions that use credentials stored in the cloud, rather than credentials stored on portable user devices. Transactions conducted using credentials stored in the cloud may be characterized as CNP (card not present) transactions in some instances. This can be an integration option with a token service system to simplify purchase solutions provided by the partners. In some embodiments, a partner may initiate token transactions such as a card-on-file transaction (e.g., in a first transaction data format) at point of sale terminals in stores. These transaction can be converted to card-not-present transactions (e.g., in a second transaction data format) before sending them to the issuers for payment transaction processing. Embodiments increase the number different types of transactions that can be conducted at merchant access devices (e.g., card not present and card present) without modifying existing legacy access devices or building new access devices.

Embodiments provide the flexibility to the merchant partners to send card present NFC contactless transactions (e.g., payWave transactions) using card-on-file tokens (e.g., tokens that have been previously associated with a card on file) to a payment processing network such as VisaNet™ and convert them to card-not-present token transactions before sending them to the issuer/issuer processor. This can help particular merchants and allow them to send the COF token transactions as if they are card present transactions to reduce the level of integration changes between the merchant and the partner.

In some embodiments, a user (e.g., a consumer) may walk into a partner's physical store. The partner may provide/operate an auxiliary device in the store that enables the consumer to use an existing card-on-file (e.g., payment credential previously provided via a partner's website, credentials stored at a secure server computer, etc.) to use for payments in store. In some embodiments, the user may provide biometric data via the auxiliary device (e.g., via a biometric reader connected to or include in the auxiliary device). The user may be authenticated (e.g., at the auxiliary device, at the secure server computer, etc.) utilizing the biometric data. If verified, the partner can make a request for a card-on-file (COF) token and/or a cryptogram associated with the user/token. The token and/or cryptogram may be associated with a credential of the user (e.g., a payment credential such as a real account identifier). In some embodiments, the secure server computer can request and store more than one cryptogram associated with the user/token at a time. In some embodiments, the auxiliary device may retrieve all cryptograms associated with the user/token from the secure server computer. The auxiliary device may provide the COF token and a cryptogram to another computer device (e.g., an access device). According to various embodiments, the COF token and the pre-fetched cryptograms may not be stored (or stored permanently) locally on the auxiliary device. In some embodiments, such information may only be stored on the secure server computer.

In some embodiments, the access device (or another resource provider computer) sends an authorization request message for a card present (CP) transaction to a processing network computer via a transport computer associated with an acquirer. The payment processing network may convert the authorization request message from a first transaction data format (e.g., a CP transaction format) to a second transaction data format (e.g., a card-not-present (CNP) transaction format). The authorization request message may be then sent to an authorizing entity computer (e.g., operated by or on behalf of an issuer associated with the credential). According to various embodiments, the processing network computer may include a transaction-by-identity identifier (e.g. flag) to the authorization request message. Upon receiving a transaction authorization response message from the issuer for the CNP transaction, the processing network computer may convert the authorization response message from the second transaction data format to the first transaction data format before sending the response to the resource provider (e.g., the access device) via the transport computer.

In some embodiments, a secure element device may be disposed between an auxiliary device and an access device. The auxiliary device may provide the token and/or or any suitable data for generating a cryptogram to the secure element device. By way of example, a limited-use key may be retrieved from a token provider computer by a secure server computer and provided to an auxiliary device. In some embodiments, the limited-use key may be provided by the auxiliary device to a secure element device where it may be stored (at least for a time). The limited-use key and the token may not be stored at the auxiliary device. In some embodiments, the auxiliary device may further provide the secure element device transaction information. The secure element device may receive additional access device data. According to various embodiments, the cryptograms may be associated with security features such as they can be limited to one-time use or a limited time use (associated with an expiration date/time). There may also be sequence limits/restrictions on how the cryptograms may be fetched.

As provided above, according to various embodiments, a secure server computer may retrieve from a token provider computer, a COF token and one or more cryptograms stored in connection with a credential of a user (e.g., a consumer). The token provider computer may store multiple cryptograms associated with a credential (e.g., a real account identifier) of the user. The secure server computer may retrieve and cache the pre-fetched cryptogram(s) to ensure that the token and cryptogram(s) are on hand (e.g., accessible without transmitting another request to the token provider computer) when a customer is standing at the checkout counter at the time of a transaction.

Embodiments may provide a new API to enable a token requestor (e.g. a partner device such as a secure server computer operated by or on behalf of a partner) to obtain a list of cryptograms. In some embodiments, only transaction authentication verification value (TAVV) cryptograms may be supported. In some embodiments, no token or payment instrument information is returned to the partner device. Embodiments may determine and incorporate an attribute to the partner profile at the payment processing network to indicate a maximum number of cryptograms that the partner device can retrieve per API call (e.g. 3, 5, 10, etc.).

FIG. 1 shows an exemplary system 100 and a process flow diagram, in accordance with at least one embodiment. The system 100 includes a user 102 operating a user device (not depicted), an auxiliary device 104, a secure server computer 108, a token provider computer 110, an access device 112, a transport computer 114, a processing network computer 116, and an authorizing entity computer 118. In some embodiments, the access device 112 may be coupled to the auxiliary device 104 or otherwise in communication with the auxiliary device. The secure server computer 108 can communicate with the user device (not depicted), the auxiliary device 104, and the token provider computer 110. In some embodiments, the auxiliary device 104 may have an API that allows it to communicate with the secure server computer 108. The access device 112 may be in communication with a processing network computer 116 and an authorizing entity computer 118 via a transport computer 114 (e.g., a computer operated on behalf of the acquirer of a merchant/provider of the access device 112).

The auxiliary device 104 and the access device 112 may be operatively coupled to each other in any suitable manner. For example, the auxiliary device 104 can be coupled to the access device 112 through a wired or wireless connection.

One method that can be performed by the system in FIG. 1 may include receiving, by an auxiliary device 104 in communication with an access device, authentication data from a user. In some embodiments, the auxiliary device 104 may request a token from the secure server computer 108 and may receive from the secure server computer 108 the token and a cryptogram (e.g., a transaction authentication verification value (TAW) generated by the token provider computer 110 in response to its request. The auxiliary device 104 may provide the token and the TAW to the access device 112, where the access device 112 can generate an authorization request message that may be transmitted to the authorizing entity computer 118 via the transport computer 114 and the processing network computer 116.

In some embodiments, the user 102 may walk into a partner's store and initiate a transaction. For example, the user 102 may select a number of items and an agent of the partner may scan the items to obtain a total amount owed by the user 102 to the partner. The total amount may include a total price for the items plus any suitable taxes and/or fees. The process flow described in connection with FIG. 1 may be utilized by the user 102 to provide payment for the transaction.

An exemplary process is illustrated in FIG. 1. At step 1, a credential (e.g., a real account identifier which has been tokenized) can be stored at the secure server computer 108. As an example, the user 102 may utilize a user device (not depicted) to access a website and/or an application hosted by a partner to provide the credential as part of an enrollment process performed by the user. As an example, the user may associate a payment credential (e.g., a credit card, a debit card, a banking account number, etc.) with their user account associated with the partner's website. The payment credential can be stored at the secure server computer 108 (e.g., the partner's or another entity's cloud-computing environment) for subsequent use.

At step 2, the user 102 can then conduct an authentication process with the auxiliary device 104. By way of example, the user 102 can enter (e.g., via a keyboard, touchpad, biometric reader, etc.) a username and password, a PIN, biometric data, or any suitable data with which the user can be authenticated (e.g., any suitable data that can be compared to previous data stored at the secure server computer 108 and associated with the user 102).

At step 3, the auxiliary device 104 may initiate verification of the authentication data. In some embodiments, the auxiliary device 104 may store authentication data in local memory and may verify the authentication data at the auxiliary device 104. In the example depicted, the auxiliary device 104 initiates verification by requesting verification be conducted by the secure server computer 108. In some embodiments, the auxiliary device 104 may request verification by requesting verification when requesting a token and/or a cryptogram from the secure server computer 108. Advantageously, a single message may be sent from the auxiliary device 104 to the secure server 108 to perform two functions including authenticating the user 102 and requesting the token. This advantageously reduces the number of steps relative to conventional transaction processing.

Verifying the authentication data received at the auxiliary device 104 may include comparing the received authentication data to previously stored authentication data associated with the user. As an example, the user 102 may provide a username and password, a PIN, biometric data, or the like at the auxiliary device 104 and the provided data transmitted to the secure server computer 108 and is compared to data stored at the secure server computer 108. If the received data matches the previously stored data, the user may be authenticated and the process may continue to step 4. If the received data does not match the previously stored data, the user 102 may not be authenticated and access to the token and/or cryptogram may be denied (e.g., a message may be transmitted from the secure server computer 108 to the auxiliary device 104 indicating authentication failed and an indication may be presented at the auxiliary device 104).

At step 4, the secure server computer 108 may request a token (e.g., a payment token corresponding to a credential stored at the secure server computer 108 and associated with the recently authenticated user 102) and/or a cryptogram (e.g., a transaction authentication verification value) from the token provider computer 110. A TAVV cryptogram can be one that accompanies a payment token in an authorization request message. In some embodiments, the TAVV may only be valid for a particular type of transaction channel (e.g., only e-commerce or only physical point of sale transactions). If the token is received during a transaction and the correct TAVV does not accompany the token, then the transaction may be denied (e.g., by the processing network computer 116 operated by or on behalf of a processing network).

The token provider computer 110 can generate a token and a TAVV using issuer provided cryptographic keys, an encryption algorithm, and input data such as data associated with a real credential or token. It should be appreciated that the secure server computer 108 may transmit a request for the token in a separate message (e.g., a token request message) and then transmit a request for the cryptogram (e.g., a cryptogram request message). In some embodiments, the secure server computer 108 can request multiple cryptograms (e.g., multiple TAVVS) for the same token. Each cryptogram may be individually be utilized in a subsequent transactions. A cryptogram request for multiple cryptograms may utilize a same or different message than a token request message and/or cryptogram request message. Methods for requesting multiple cryptograms may be discussed further with respect to FIG. 7.

At step 5, the token provider computer 110 can transmit the generated token and cryptogram(s) to the secure server computer 108. The secure server computer 108 can store the token and cryptogram(s) in memory at the secure server computer 108 (and/or at another storage location accessible to the secure server computer 108).

At step 6, the secure server computer 108 may transmit the token and a cryptogram (e.g., a TAVV) to the auxiliary device 104.

At step 7, the auxiliary device 104 can generate (e.g., via an application operating at the auxiliary device 104) a near field communications (NFC) payload incorporating the token and the cryptogram and can initiate an NFC transaction with the access device 112. It should be appreciated that the auxiliary device 104 can utilize any suitable data communication not necessarily NFC to transmit the token and the cryptogram to the access device 112. In some embodiments, the auxiliary device 104 may emulate a payment card (e.g., a smartcard) and may exchange data with the access device 112. Card emulation may be discussed in more detail with respect to FIG. 11. Still alternatively, the auxiliary device 104 may be hardwired or connected via a cable connector to the access device 112 in other embodiments.

At step 8, the access device 112 may send an authorization request message (e.g., an authorization request message indicating a card present transaction) to the transport computer 114 operated by an acquirer. The authorization request message can include data in a first transaction data format such as a card present contactless transaction data format.

At step 9, the transport computer 114 may transmit the authorization request message to the processing network computer 116. The processing network computer 116 can extract the cryptogram (e.g., the TAVV) and can validate the TAVV cryptogram. The TAW can be validated by obtaining cryptogram inputs (e.g., a token, counter, etc.) from the authorization request message, and then the inputs may be encrypted using a cryptographic key corresponding to the cryptographic key used to form the TAVV. The generated TAW can then be compared to the TAW in the authorization request message. If they match, the TAW is validated and the transaction may continue to proceed. If they do not match, then the transaction may be declined. In other embodiments, the TAW can be validated by decrypting the TAW in the authorization request message using a corresponding cryptographic key to obtain the inputs to the TAW. The recovered inputs may be compared with the inputs in the authorization request message to validate the TAW.

At step 10, the processing network computer 116 may detokenize the token to obtain a real account identifier (e.g., a personal account number (PAN) associated with the token. In this regard, the processing network computer 116 may communicate with the token provider computer 110. For example, the processing network computer 116 may provide the token and the cryptogram to the token provider computer 110. The token provider computer 110 may verify that the token and the cryptogram are associated with one another. If so, the token provider computer 110 may respond with the real account identifier associated with the token and cryptogram.

At step 11, the processing network computer 116 may convert the authorization request message to a second transaction data format (e.g., a card not present or e-commerce transaction data format). In some embodiments, the second transaction data format may include an indicator (e.g., an e-commerce (EC) 17 indicator). As an example, the processing network computer 116 may be configured to utilize the following table for performing conversions between a first and second transaction data format.

| 1st transaction data format (card present) | 2nd transaction data format (card-not-present) |
| --- | --- |
| Field 22: POS Entry Mode Code = 07 | Field 22-POS Entry Mode Code = 01 |
| Field 35-Track 2 Data | No field 35 |

| 1st transaction data format (card present) | 2nd transaction data format (card-not-present) |
| --- | --- |
| Field 44.5-CVV/ICVV Results Code | No field 44.5 |
| Field 45-Track 1 Data | No field 45 |
| Field 55-Cryptogram Chip Data | No field 55 |
| No filed 44.13 | Filed 44.13-CAVV Results Code |
| Field 60.8-Electronic Commerce Indicator = 5 | Field 60-Electronic Commerce Indicator = 7 |
| TLV Field 123, Usage 2, Dataset ID 66-AVS Data | TLV Field 123, Usage 2, Dataset ID 66-AVS Data |
| TLV Field 123, Usage 2, Dataset ID 68-AVS Data | TLV Field 123, Usage 2, Dataset ID 68-AVS Data |
| No field 126.9 | Field 126.9, Usage 3, Position 7, 3-D Secure CAVV, Revised Format (e.g., moved from field 55 of 1st transaction data format) |

At step 12, the processing network computer 116 may transmit the converted authorization request message to the authorizing entity computer 118. The authorizing entity computer 118 receives the authorization request message with the PAN, the TAW, and an EC17 indicator. An EC17 indicator may be an indicator that the TAVV and/or the authorization request message was validated.

At step 13, the authorizing entity computer 118 can approve or decline the authorization request message and can transmit an authorization response message back to processing network computer 116. The authorization response message may be in any suitable format (e.g., the second transaction data format).

At step 14, the processing network computer 116 may transmit the authorization response message to the transport computer 114. It should be appreciated that, in some embodiments, the processing network computer 116 may convert the authorization response message from a second transaction data format to a first transaction data format prior to the transmission.

At step 15, the transport computer 114 may transmit the authorization response message to the access device 112.

At step 16, the auxiliary device 104 can then delete the token and/or cryptogram from memory. It should be appreciated that this deletion can occur at any suitable time after performance of the operations of step 7. In some embodiments, the access device 112 can transmit an indication that the authorization response message of step 15 was received, which can cause the auxiliary device 104 to delete the token and cryptogram from memory. Deletion of the data in the auxiliary device 104 can occur manually (e.g., in response to a user selecting a button on the auxiliary device 104) or automatically (e.g., in response to receiving an authorization response message for the transaction or after a predetermined period of time (e.g., 10 minutes).

At a subsequent time, a clearing and settlement process can be conducted between the transport computer 114, the processing network computer 116, and the authorizing entity computer 118.

Figure 2:
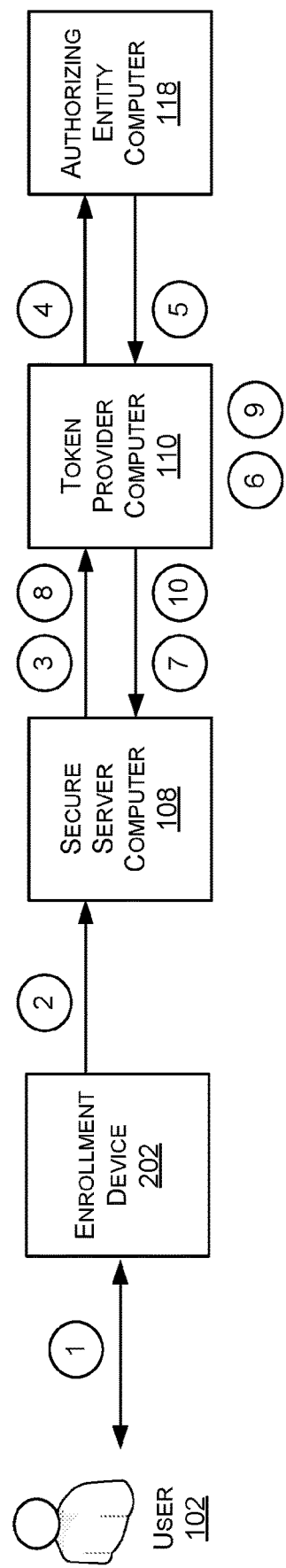
FIG. 2 shows an exemplary system and a process flow diagram illustrating a token and/or cryptogram provisioning process, in accordance with at least one embodiment.

FIG. 2 shows an exemplary system 200 and a process flow diagram illustrating a token and/or cryptogram provisioning process, in accordance with at least one embodiment. In some embodiments, some parts the process illustrated in FIG. 2 (e.g., steps 1-7, steps 1-10, etc.) may be performed prior to the process depicted in FIG.

At step 1, a user 102 may utilize an enrollment device 202 to input payment card data (e.g., a credit card number, a debit card number, an expiration date, a cardholder name, a CVV, etc.). In some embodiments, the enrollment device 202 may be an example of the auxiliary device 104 of FIG. 1 and the enrollment device 202 may be located in a physical store (e.g., a merchant's store). The enrollment device 202 may, in that use case, be provided by a partner (e.g., a merchant) for interfacing with the partner's backend system (e.g., the secure server computer 108). As another example, the enrollment device 202 may be a user device of the user 102 and the enrollment device 202 may be utilized to access the partner's website (e.g., hosted by the secure server computer 108 or another suitable system) in order to provide the payment card data.

In either scenario, at step 2, the enrollment device 202 may be utilized to provide the payment card data to the secure server computer 108. The payment card data may be stored at the secure server computer 108 and associated with the user 102 (e.g., via a user account associated with the user 102 and managed by the secure server computer 108).

At step 3, the secure server computer 108 may submit a token request to a token provider computer 110 for a token (e.g., for a card on file token). The token request may be in any suitable form (e.g., a token request message).

At step 4, the token provider computer 110 may perform an eligibility check. By way of example, the token provider computer 110 may transmit a message (e.g., a token request message or any suitable message) to the authorizing entity computer 118 to check for the issuer's participation and/or to request tokenization. In some embodiments, the token provider computer 110 may request approval to generate the token from the authorizing entity computer 118 without performing identification and/or verification of the user 102. Accordingly, in some embodiments, the token provider computer 110 may rely on authentication efforts and/or an assertion that the user 102 has been authentication as provided by the secure server computer 108.

At step 5, the authorizing entity computer 118 may use the data received at step 4 to determine whether to approve or decline the request. The authorizing entity computer 118 may transmit a response (e.g., a token response message or any suitable message) to the token provider computer 110 indicating the request has been approved or declined.

At step 6, based on receiving an indication that the request was approved, the token provider computer 110 may generate a token for the payment data and maintain an association (e.g., a mapping) between the token and the payment card data in memory. In some embodiments, the token provider computer 110 may be configured to generate one or more cryptograms for the newly generated token. If so, the cryptogram(s) (e.g., multiple TAVVs) may also be associated with (e.g., mapped to) the token and the payment card data in memory. In some embodiments, the token provider computer 110 may generate one or more cryptograms as part of a separate request (e.g., in response to receiving a cryptogram request message).

At step 7, the token provider computer 110 may provide the token (and if cryptogram(s) were generated, the cryptogram(s)) to the secure server computer 108 (e.g., via a token response message).

In some embodiments, the secure server computer 108 can request one or more cryptograms via a separate request. For example, at step 8, the secure server computer 108 can transmit a cryptogram request message to the token provider computer 110. The cryptogram request message may be in any suitable form. In some embodiments, the cryptogram request message may utilize a particular predefined API specifically for requesting a list of cryptograms. In some embodiments, the cryptogram request message may include a token identifier for the token and/or a number of cryptograms requested. In some embodiments, if a number is not provided, the token provider computer 110 may default the request to one cryptogram being requested. The cryptogram request message may include a transaction type (e.g., an e-commerce transaction type to be used for transaction initiated online via a website, a recurring payment transaction type, a point-of-sale transaction type, etc.).

At step 9, the token provider computer may perform a process for generating one or more cryptograms (e.g., TAVVs). This process may be discussed further below in connection with FIG. 7.

At step 10, the token provider computer 110 may provide the one or more cryptograms to the secure server computer 108 via a cryptogram response message. In some embodiments, the cryptogram response message may include the token identifier, the token, a list of the one or more cryptograms, an e-commerce indicator, an error code, or any suitable combination of the above. In some embodiments, the token provider computer 110 may provide a cryptogram response message that includes an error code rather than the one or more cryptograms requested. By way of example, the token provider computer 110 may provide a cryptogram response message that indicate the token requestor (e.g., the secure server computer 108) is not authorized to use the particular API for requesting multiple cryptograms. As another example, the token provider computer 110 may provide a cryptogram response message that includes an error code that indicates the requested action is not allowed.

FIGS. 3-6 shows exemplary methods for authenticating a user, in accordance with at least one embodiment.

Figure 3:
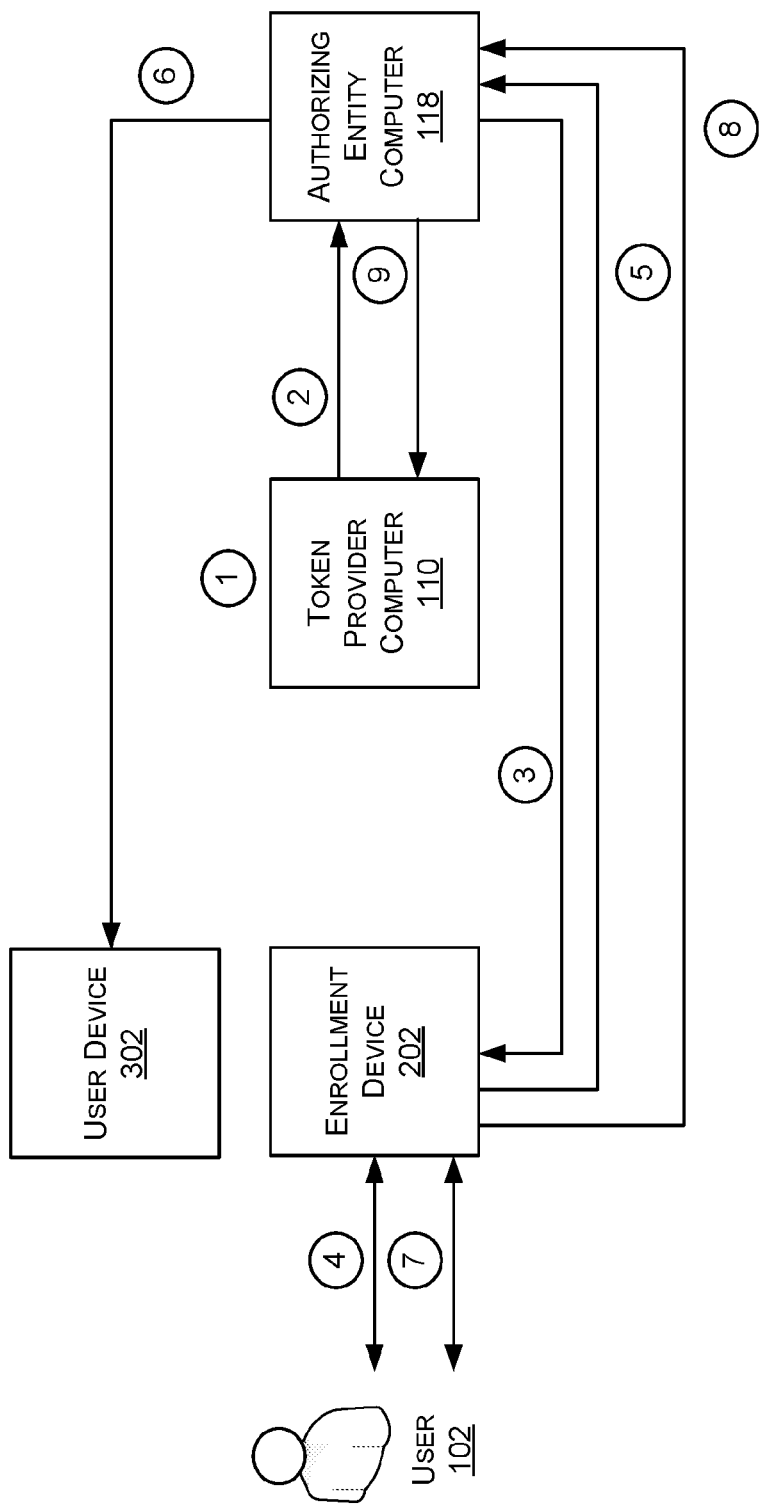
FIGS. 3-6 shows exemplary methods for authenticating a user, in accordance with at least one embodiment.

FIG. 3 shows an exemplary method 300 for authenticating a user with a one-time password after the process described in FIG. 2 has been completed, in accordance with at least one embodiment. In some embodiments, the user 102 may be authenticated using a one-time password after enrollment has occurred and a token has been generated (e.g., by the token provider computer 110).

At step 1, the token provider computer 110 may generate a one-time password. The one-time password may be associated with the user 102 (e.g., via a mapping maintained by the token provider computer 110 including, for example, an identifier for the user 102, the credential of the user (e.g., payment card data), the token generated for the credential, and the one-time password). The token provider computer 110 may be configured to maintain a record that indicates that the token is active (e.g., available for use) or inactive (e.g., unavailable for use) based on whether the user has been verified with a one-time password. If the user 102 has not been verified with a one-time password, the token may be inactive. If the user 102 has been verified with a one-time password, the token may be recorded as being active.

At step 2, the token provider computer 110 may transmit the one-time password to the authorizing entity computer 118. The authorizing entity computer 118 may be configured to maintain one or more contact data for the user 102. By way of example, the authorizing entity computer 118 may include a phone number (e.g., for SMS messaging) and/or an email address (e.g., for electronic mail).

At step 3, the authorizing entity may prompt the user (e.g., via the enrollment device 202) to indicate a preferred contact method (e.g., email, SMS messaging, etc.).

At step 4, the user 102 may select a preferred contact method (e.g., SMS messaging). As in FIG. 2, the enrollment device may be a user device associated with the user 102 or the auxiliary device 104 of FIG. 1, but generally the enrollment device 202 may be the device utilized by the user 102 to perform the enrollment process of FIG. 2.

At step 5, the selection may be transmitted back to the authorizing entity computer 118.

At step 6, the authorizing entity computer 118 may transmit the one-time password using the selected preferred contact method (e.g., SMS messaging). The one-time password may, for example, be transmitted via SMS message to the user device 302 using a phone number known to the authorizing entity computer 118 and associated with the user 102. It should be appreciated that, in some embodiments, the user device 302 may be the same device as the enrollment device 202.

At step 7, the user may enter the one-time password received at user device 302 into an interface provided at the enrollment device 202 (e.g., the auxiliary device 104). The input may be transmitted to the authorizing entity computer 118 at step 8 and forwarded to the token provider computer 110 at step 9. The token provider computer 110 may be configured to activate the token for use if the one-time password received at step 9 matches the one-time password generated at step 1.

Figure 4:
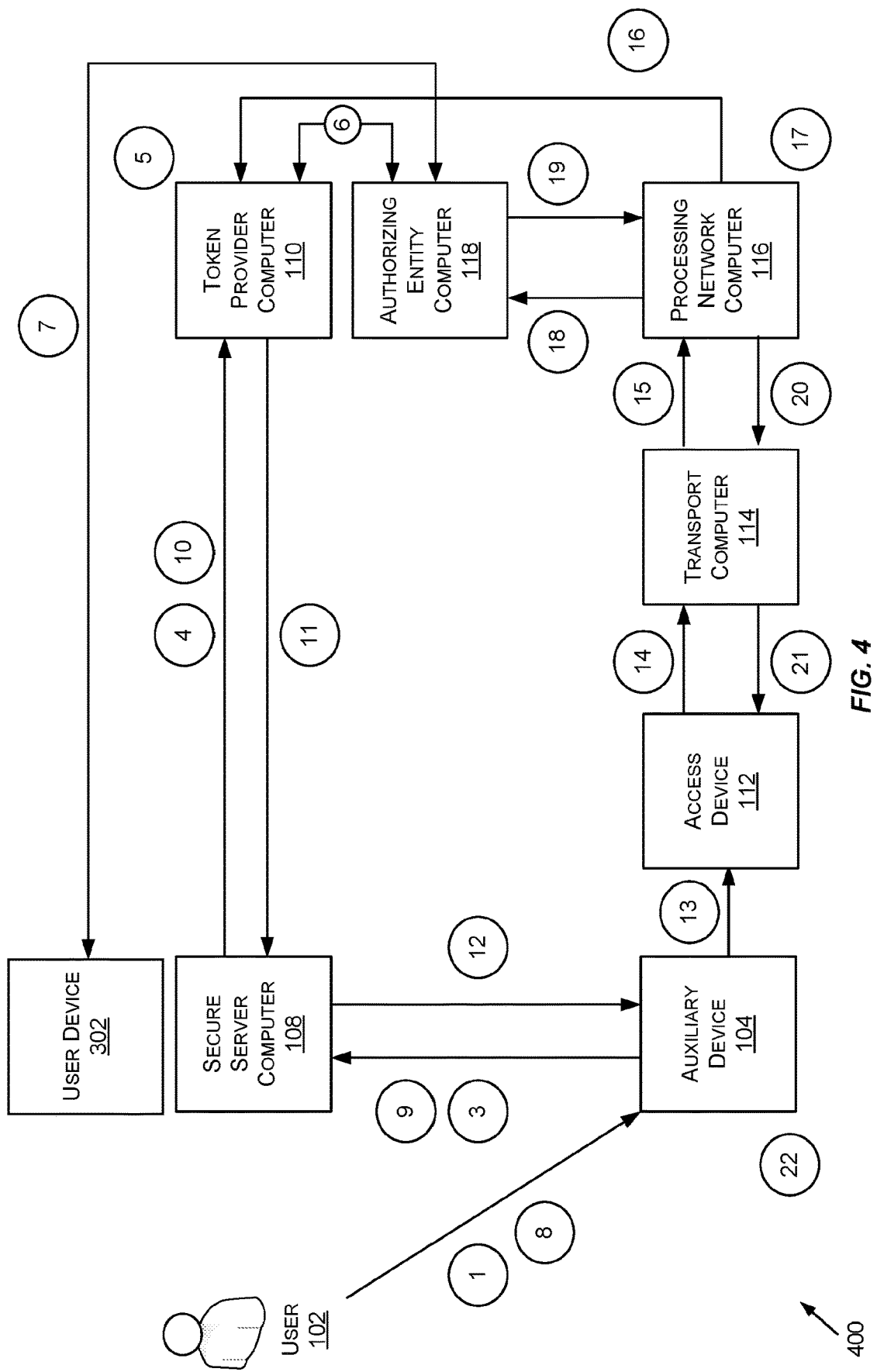

FIG. 4 shows an exemplary method 400 for authenticating a user with a one-time password during a transaction, in accordance with at least one embodiment. In some embodiments, the user 102 may have performed the enrollment process described in FIG. 2 but has not yet authenticated himself using a one-time password as described in FIG. 3. In some embodiments, the user 102 may be prompted during a transaction for the one-time password. Thus, prior to performing the method 400, the secure server computer 108 may store a token corresponding to a credential (e.g., payment data) associated with the user 102.

At step 1, the user 102 can then authenticate to the auxiliary device 104. By way of example, the user 102 can enter (e.g., via a keyboard, touchpad, biometric reader, etc.) authentication data (e.g., a username and password, a PIN, biometric data, or any suitable data with which the user can be authenticated) into the auxiliary device 104.

At step 2, the auxiliary device 104 may initiate verification of the authentication data. In the example depicted, the auxiliary device 104 initiates verification by requesting verification be conducted by the secure server computer 108. In some embodiments, the auxiliary device 104 may request verification of the authentication data at the same time that the auxiliary device 104 requests a token and/or a cryptogram from the secure server computer 108. In some embodiments, the secure server computer 108 stores the token associated with the credential of the user 102. In some embodiments, the token is inactive. Verifying the authentication data received at the auxiliary device 104 may include comparing the received authentication data to previously stored authentication data associated with the user. If the received authentication data matches the previously stored data, the user may be authenticated by the secure server computer 108 and the process may continue to step 4. If the received data does not match the previously stored data, the user 102 may not be authenticated and access to the token and/or cryptogram may be denied (e.g., a message may be transmitted from the secure server computer 108 to the auxiliary device 104 indicating authentication failed and an indication may be presented at the auxiliary device 104).

At step 4, the secure server computer 108 may request (e.g., from the token provider computer 110) a cryptogram corresponding to the token stored at the secure server computer 108. A TAVV cryptogram can be one that accompanies a payment token in an authorization request message. In some embodiments, the TAVV may only be valid for a particular type of transaction channel (e.g., only e-commerce or only physical point of sale transactions). If the token is received during a transaction and the correct TAW does not accompany the token, then the transaction may be denied (e.g., by the processing network computer 116 operated by or on behalf of a processing network).

At step 5, the token provider computer 110 can determine that the token is in an inactive state and may generate a one-time passcode. The token provider computer 110 can provide the one-time password to the authorizing entity computer 118 at step 6.

At step 7, the authorizing entity computer 118 may transmit the one-time password using a previously selected preferred contact method (e.g., SMS messaging) or utilizing one or more contact methods (e.g., SMS messaging, email, etc.) based at least in part on contact data previously provided to the authorizing entity by the user 102. The one-time password may, for example, be transmitted via email message to an email address known to the authorizing entity computer 118 and associated with the user 102. The email message may be viewable from the user device 302.

At step 8, the user may enter the one-time password received at user device 302 into an interface provided at the auxiliary device 104. In some embodiments, the token provider computer 110 may transmit (e.g., in response to receiving the request at step 4) an indication to the secure server computer 108 that the user 102 has not been authenticated via a one-time password. In response to receiving this indication, the secure server computer 108 may cause the auxiliary device 104 to provide the interface. The input provided via the interface may be transmitted to the secure server computer 108 at step 9 and forwarded to the token provider computer 110 at step 10. The token provider computer 110 may be configured to activate the token for use if the one-time password received at step 10 matches the one-time password generated at step 5.

If the token is activated, the steps 11-22 may be performed. Steps 11-22 of FIG. 4 may correspond to steps 5-16 of FIG. 1 and will not be repeated here for brevity.

Figure 5:
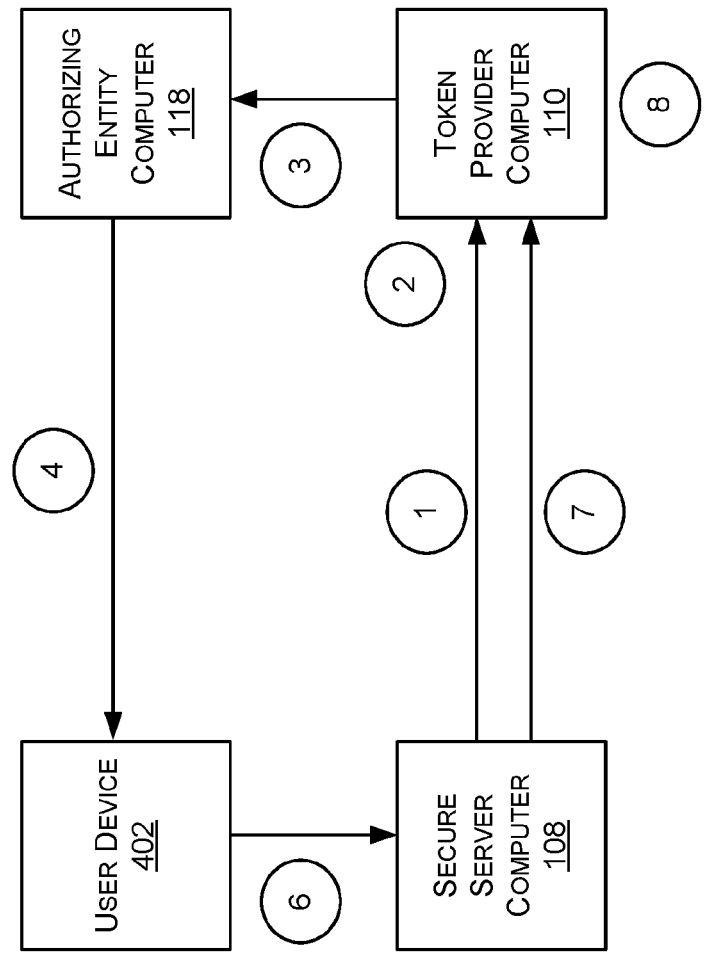

FIG. 5 shows an exemplary method 500 for authenticating a user with a one-time password, in accordance with at least one embodiment. In some embodiments, the user 102 may have performed the enrollment process described in FIG. 2, but has not yet authenticated himself using a one-time password. In some embodiments, a token may be generated as described in connection with FIG. 1. However, the token may be activated for limited use. By way of example, a number of limited use thresholds may be associated with the token by the token provider computer 110 such that the token may be activated for a time period or for a certain number of transactions (e.g., 1, 2, 5, etc.) before it is inactivated if the user has not been authenticated with a one-time password prior to expiration of the limited use thresholds.

FIG. 5 depicts a use case in which the one-time password is prompted by the partner and provided via an interface associated with the partner. The method 500 may be performed as part of the process of FIG. 1 (e.g., after the token is provided to the secure server computer 108 at step 5).

At step 1 of method 500, the secure server computer 108 may request a one-time password from the token provider computer 110.

At step 2, the token provider computer 110 may generate a one-time passcode. The token provider computer 110 can provide the one-time password to the authorizing entity computer 118 at step 3.

At step 4, the authorizing entity computer 118 may transmit the one-time password using a previously selected preferred contact method (e.g., SMS messaging) or utilizing one or more contact methods (e.g., SMS messaging, email, etc.) based at least in part on contact data previously provided to the authorizing entity by the user 102. The one-time password may, for example, be transmitted via SMS message to phone number known to the authorizing entity computer 118 and associated with the user 102. The SMS message may be viewable from the user device 402.

At step 6, the user may utilize the user device 402 (or another suitable computing device) to access an interface provided by the secure server computer 108 (e.g., a webpage interface hosted by the partner via the secure server computer 108 or another suitable web server computer). The user 102 may enter the one-time password received at user device 302 into an interface provided by the secure server computer 108. The input may be received by the secure server computer 108 via the interface.

At step 7, the secure server computer 108 may forward the input to the token provider computer 110.

At step 8, the token provider computer 110 may be configured to activate the token for use if the one-time password received at step 7 matches the one-time password generated at step 2.

Figure 6:
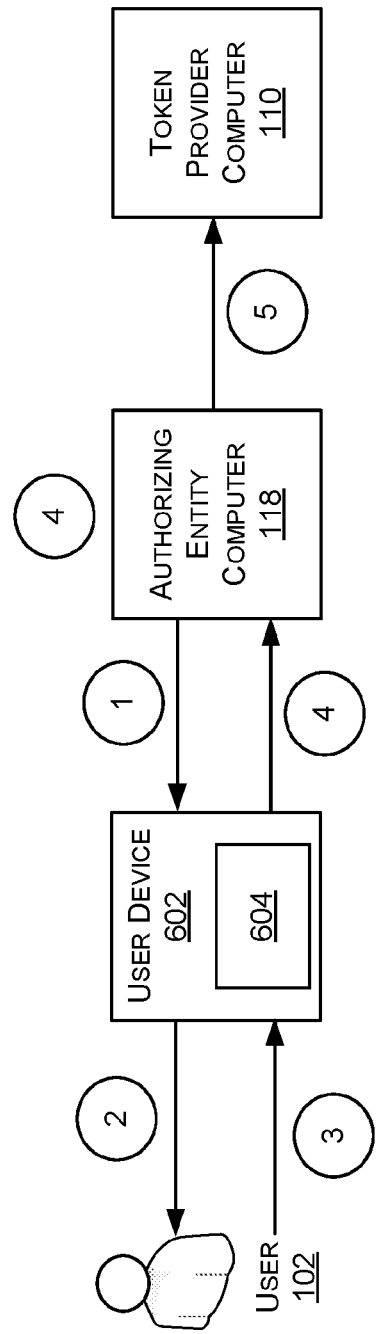

FIG. 6 shows another exemplary method 600 for authenticating a user via an issuer application, in accordance with at least one embodiment. In some embodiments, the user 102 may have performed the enrollment process described in FIG. 2, but has not yet authenticated himself via an issuer application. In some embodiments, a token may be generated as described in connection with FIG. 1. However, the token may be activated for limited use. By way of example, a number of limited use thresholds may be associated with the token by the token provider computer 110 such that the token may be activate for a time period or for a certain number of transactions (e.g., 1, 2, 5, etc.) before it is inactivated if the user has not been authenticated via an issuer application prior to expiration of the limited use thresholds.

FIG. 6 depicts a use case in which authentication is prompted by the issuer and provided via an interface associated with the issuer. The method 600 may be performed as part of the process of FIG. 2 (e.g., after step 4 when an approval for generating a token is received by the authorizing entity computer 118) or at any suitable time.

At step 1, the authorizing entity computer 118 may transmit instructions to the user device 602 for performing authentication utilizing a one-time password. The instructions may be received by the user device 602 via a client application 604 executing on the user device 602 and hosted by the issuer.

At step 2, the user 102 may review instructions (e.g., from the authorizing entity computer 118) via an client application 604 associated with the issuer and operating at the user device 602. By way of example, the user 102 may receive a hyperlink and instructions to complete an authentication process via an interface of the client application 604. The instructions may detail that the user 102 is to login to his account via the client application 604.

At step 3, the user 102 may attempt to login to an account associated with the issuer utilizing the client application 604 by providing a credential (e.g., a username and password, a PIN, biometric data, or the like).

At step 4, the credential may be transmitted to the authorizing entity computer 118 (the computer hosting the client application 604). If the credential matches one stored by the issuer and associated with the user 102, the authorizing entity computer 118 may determine the user 102 is authenticated and the method 600 may proceed to step 5.

At step 5, the authorizing entity computer 118 may transmit an indication that the user 102 has been verified. This indication may be included in the message transmitted at step 5 of FIG. 2 in some embodiments. The token provider computer 110 may be configured to activate the token upon receiving the indication at step 5.

Figure 7:
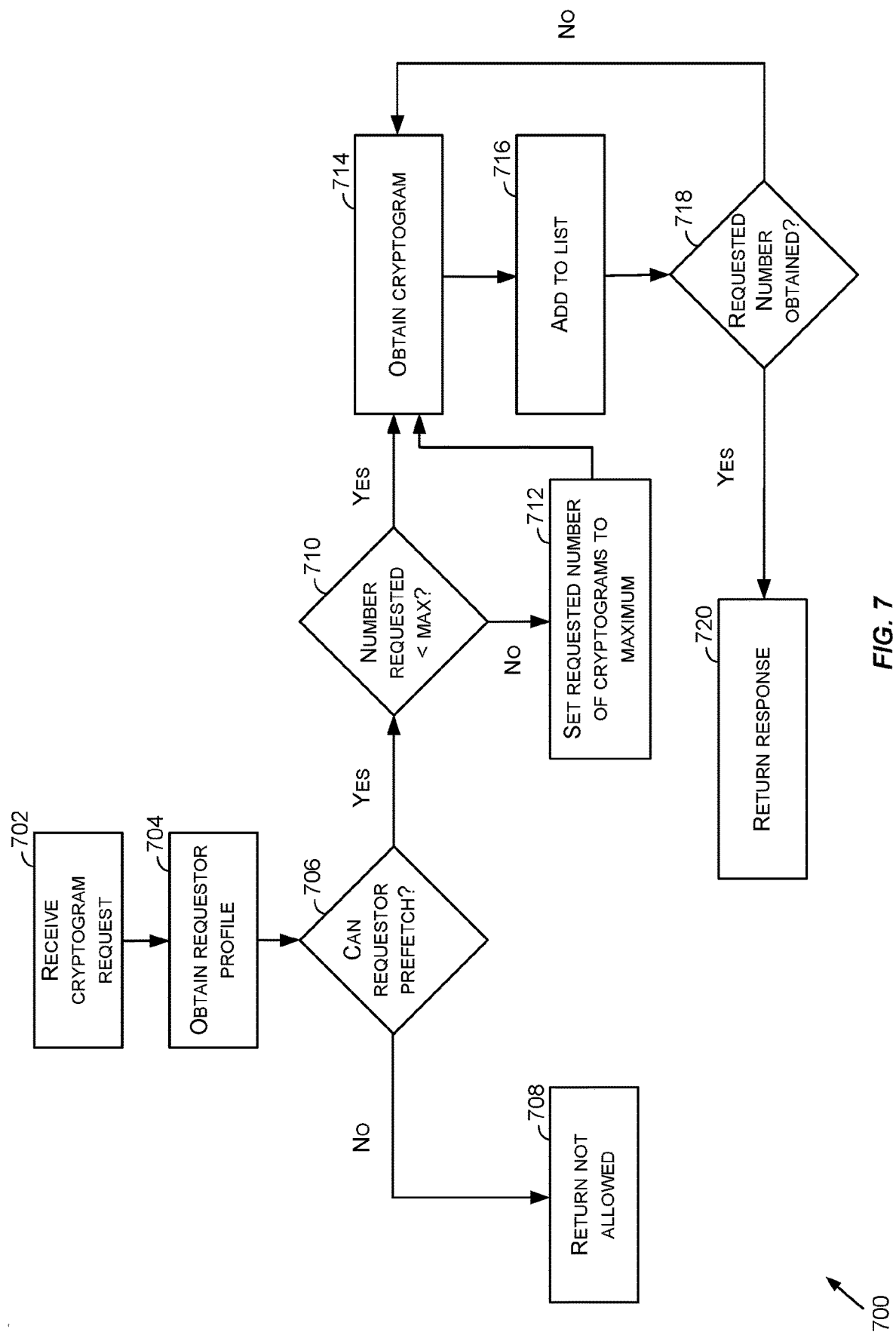
FIG. 7 shows an process flow diagram for an exemplary process for generating multiple cryptograms, in accordance with at least one embodiment.

FIG. 7 shows an process flow diagram for an exemplary process 700 for generating multiple cryptograms, in accordance with at least one embodiment. The process depicted in FIG. 7 may be performed by the token provider computer 110 of FIG. 2.

The process 700 may begin at 702, where a cryptogram request may be received (e.g., via a cryptogram request message). By way of example, the token provider computer 110 may receive a cryptogram request message from a token requestor (e.g., the secure server computer 108 of FIG. 2).

At 704, the token provider computer 110 may obtain a profile associated with the token requestor. As a non-limiting example, a token requestor (e.g., a partner associated with the secure server computer 108) may have previously performed an enrollment process and/or entered into an agreement with the token provider associated with the token provider computer 110. The token provider computer 110 may be configured to store profile data for one or more token requestors that include data corresponding to that enrollment process and/or agreement. By way of example, the profile data may include data such as a number of cryptograms that are allowed to be requested by the token requestor in a given request (or a number of cryptograms allowed to be requested by the token requestor for a given token). In some embodiments, the partner may be an electronic wallet provider that provides an electronic wallet application at the auxiliary device 104 of FIG. 2 that is hosted by the secure server computer 108.

At 706, the token provider computer 110 may determine whether the token requestor may pre-fetch cryptograms (e.g., whether the token requestor is allowed to request multiple cryptograms for a given token and/or for a given request).

If the token requestor (e.g., the secure server computer 108) is not allowed to pre-fetch cryptograms (e.g., as indicated in the profile data associated with the secure server computer 108/the partner), the flow may proceed to 708, where an error code indicating the request is not allowed and the process 700 may end.

Alternatively, if the token requestor (e.g., the secure server computer 108) is not allowed to pre-fetch cryptograms (e.g., as indicated in the profile data associated with the secure server computer 108/the partner), the flow may proceed to 710. At 710, the token provider computer 110 may determine whether a number of requested cryptograms included in the cryptogram request message is less than a maximum number of cryptograms allowed for the token requestor (and/or for a single token).

If the number of cryptograms requested in the request is greater than or equal to the maximum number of cryptograms allowed for the token requestor (and/or for a single token) the flow may proceed to 712. At 712, the requested number of cryptograms may be set to the maximum number of cryptograms allowed and the flow may proceed to 714. If the number of cryptograms requested in the request is less than the maximum number of cryptograms allowed for the token requestor (and/or for a single token) the flow may proceed directly to 714.

At 714, the token provider computer 110 may obtain a cryptogram (e.g., generate a cryptogram such as a TAW) using any suitable cryptogram generation process.

At 716, the token provider computer 110 may add the obtained cryptogram to a list of cryptograms and the flow may proceed to 718.

At 718, the token provider computer 110 may be configured to determine whether the requested number of cryptograms have been obtained. If the requested number of cryptograms has been obtained, the flow may proceed to 720 where a cryptogram response message may be transmitted to the token requestor (e.g., the secure server computer 108). The cryptogram response message may include the list of cryptograms. If the requested number of cryptograms has not been obtained, the flow may proceed back to 714. Steps 714 through 718 may be repeated any suitable number of times corresponding to the number of cryptograms requested (or the number of cryptograms requested after 712).

Figure 8:
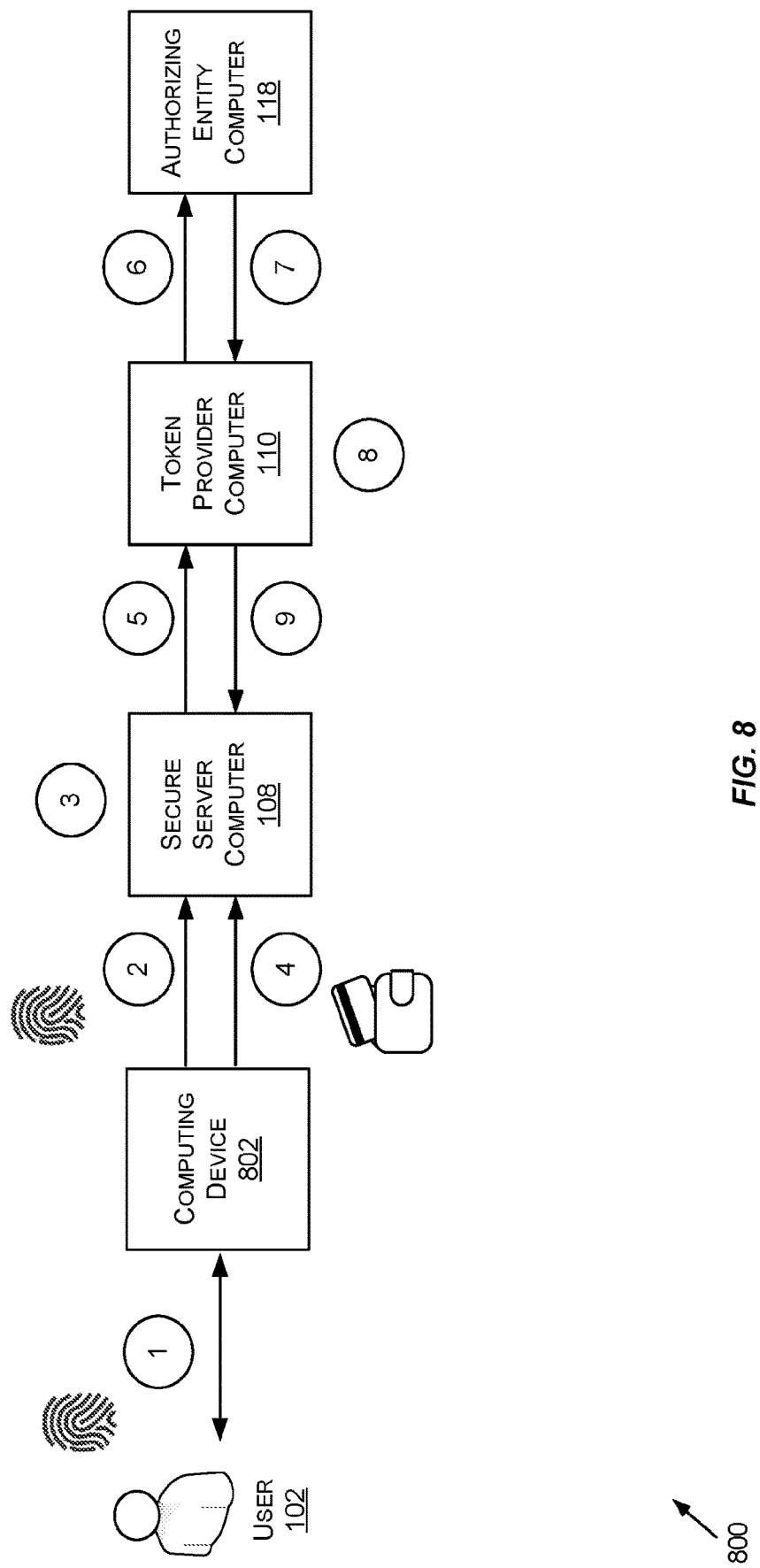
FIG. 8 shows an exemplary process flow diagram for performing a biometric enrollment process, in accordance with at least one embodiment.

FIG. 8 shows an exemplary system 800 (e.g., the system 100 of FIG. 1) and a process flow diagram for performing a biometric enrollment process, in accordance with at least one embodiment. In some embodiments, at least some portion of the process illustrated in FIG. 8 may be performed prior to the process depicted in FIG. 1.

At step 1, a user 102 may utilize a computing device 802 to provide biometric data (e.g., a fingerprint, a retina scan, an facial image, etc.). In some embodiments, the computing device 802 may be an example of a user device or an auxiliary device (e.g., the auxiliary device 104 of FIG. 1). The computing device 802 may include one or more input devices configured to receive biometric data. For example, the computing device 802 may include a biometric reader, a camera, a retina scanner, and/or the like. The computing device 802 may, in some cases, be provided by a partner (or a merchant) for interfacing with the partner's backend system (e.g., the secure server computer 108). As another example, the computing device 802 may be a user device of the user 102 and the computing device 802 may be utilized to access the partner's website (e.g., hosted by the secure server computer 108 or another suitable system) in order to provide biometric data.

According to various embodiments, the computing device 802 (e.g., the auxiliary device 104 of FIG. 1) may be a biometric capable device that meets the security, functional, and/or biometric capture requirements defined by one or more of a token provider, a processing network, and/or an issuer. Generally, the computing device 802 can be capable of capturing one or more of the biometric modalities (e.g. fingerprint, facial imprint, eye/retina scan, voice sample). The computing device 802 may also protect and transmit the captured biometric data to the secure server computer 108 (e.g., for storage) and the computing device 802 may protect cardholder data and payment credentials (PCI and PII). In addition, some embodiments may use an existing access device (e.g., a POS device) to process payment transaction. For such embodiments, the computing device 802 may include hardware capable of interacting with the existing access devices (NFC, QR Code, Magnetic stripe, etc.). Depending on the biometric modality or modalities, the hardware may also have additional sensors to detect the proximity of consumers in order to assist in determining whether, and which, consumer is intending to make a payment.

Systems discussed in connection with various embodiments may also include client applications (e.g. application software) developed to run on the computing device 802. During enrollment, the application may guide a user through the enrollment process and interact with the necessary biometric credential and payment credential repositories (e.g., the secure server computer 108). For example, the client application may instruct the user how to interact in order that sufficient biometric data for a modality is captured. For example, if using a fingerprint modality, the client application may instruct the consumer to roll a finger on the sensor or present the same finger multiple times and at multiple angles. The client application may further be configured to provide the necessary data to link the biometric to a payment credential. In some embodiments, the client application may be configured to complete all necessary identification and/or verification processes to authenticate the user 102.

At step 2, the computing device 802 may be utilized to provide the biometric data to the secure server computer 108. In some embodiments, the biometric data may be provided with a credential (e.g., a username/password, a PIN, etc.) associated with a previously existing user account. In some embodiments, the credential (e.g., payment card data) may be captured from a physical card (e.g., via NFC, a camera, a chip, a magstripe payment card, etc.) to be linked to the captured biometric data.

At step 3, the secure server computer 108 may create a user account (or access a previously existing user account with the credential provided) in response to receiving the biometric data. The biometric data may be stored at the secure server computer 108 and associated with the user 102 (e.g., via the user account managed by the secure server computer 108).

At step 4, the computing device 802 may be utilized by the user 102 to provide a payment data (e.g., an account identifier, a PAN, a credit card number, a debit card number, etc.) to the secure server computer 108. In some embodiments, the user account accessed at step 3 may already be associated with payment data. Thus, in some examples, step 4 would not necessarily be performed. It should also be appreciated that step 4 may, in some embodiments, be performed before step 2 and that the user account, if created, may be created response to receiving the credential. Thus, either the credential or the biometric data may be received first.

At step 5, the secure server computer 108 may submit a token request to a token provider computer 110 for a token (e.g., for a card on file token). The token request may be in any suitable form (e.g., a token request message).

At step 6, the token provider computer 110 may perform an eligibility check. By way of example, the token provider computer 110 may transmit a message (e.g., a token request message or any suitable message) to the authorizing entity computer 118 to check for the issuer's participation and/or to request tokenization. In some embodiments, the token provider computer 110 may request approval to generate the token from the authorizing entity computer 118 without performing identification and/or verification of the user 102. Accordingly, in some embodiments, the token provider computer 110 may rely on authentication efforts and/or an assertion that the user 102 has been authentication as provided by the secure server computer 108.

At step 7, the authorizing entity computer 118 may use the data received at step 6 to determine whether to approve or decline the request. The authorizing entity computer 118 may transmit a response (e.g., a token response message or any suitable message) to the token provider computer 110 indicating the request has been approved or declined.

At step 8, based on receiving an indication that the request was approved, the token provider computer 110 may generate a token for the payment data and maintain an association (e.g., a mapping) between the token, the payment card data, and the biometric data in memory.

In some embodiments, the token provider computer 110 may be configured to generate one or more cryptograms for the newly generated token. If so, the cryptogram(s) (e.g., multiple TAVVs) may also be associated with (e.g., mapped to) the token and the payment card data in memory. In some embodiments, the token provider computer 110 may generate one or more cryptograms as part of a separate request (e.g., in response to receiving a cryptogram request message).

At step 9, the token provider computer 110 may provide the token (and if cryptogram(s) were generated, the cryptogram(s)) to the secure server computer 108 (e.g., via a token response message). The token (and cryptogram(s)) may be stored at the secure server computer 108.

In some embodiments, the secure server computer 108 can request one or more cryptograms via a separate request. For example, operations corresponding to steps 8-10 of FIG. 2 may be performed to obtain one or more cryptograms corresponding to the token.

FIG. 8 merely shows one example biometric enrollment process. In the enrollment process described above, sufficient biometric data may be captured to be able to perform a near real-time identification and match of biometric data. While not necessarily performed on the same device as used to capture the biometric data, a key component of enrollment is the ability to verify the identity of the user 102. Thus, in some embodiments one or more of the secure server computer 108, the token provider computer 110, or the authorizing entity computer 118 may perform an identification and verification process with the user 102. Embodiments disclosed herein assure that there is a strong link between the cardholder, their biometric data, and their chosen credential(s).

Figure 9:
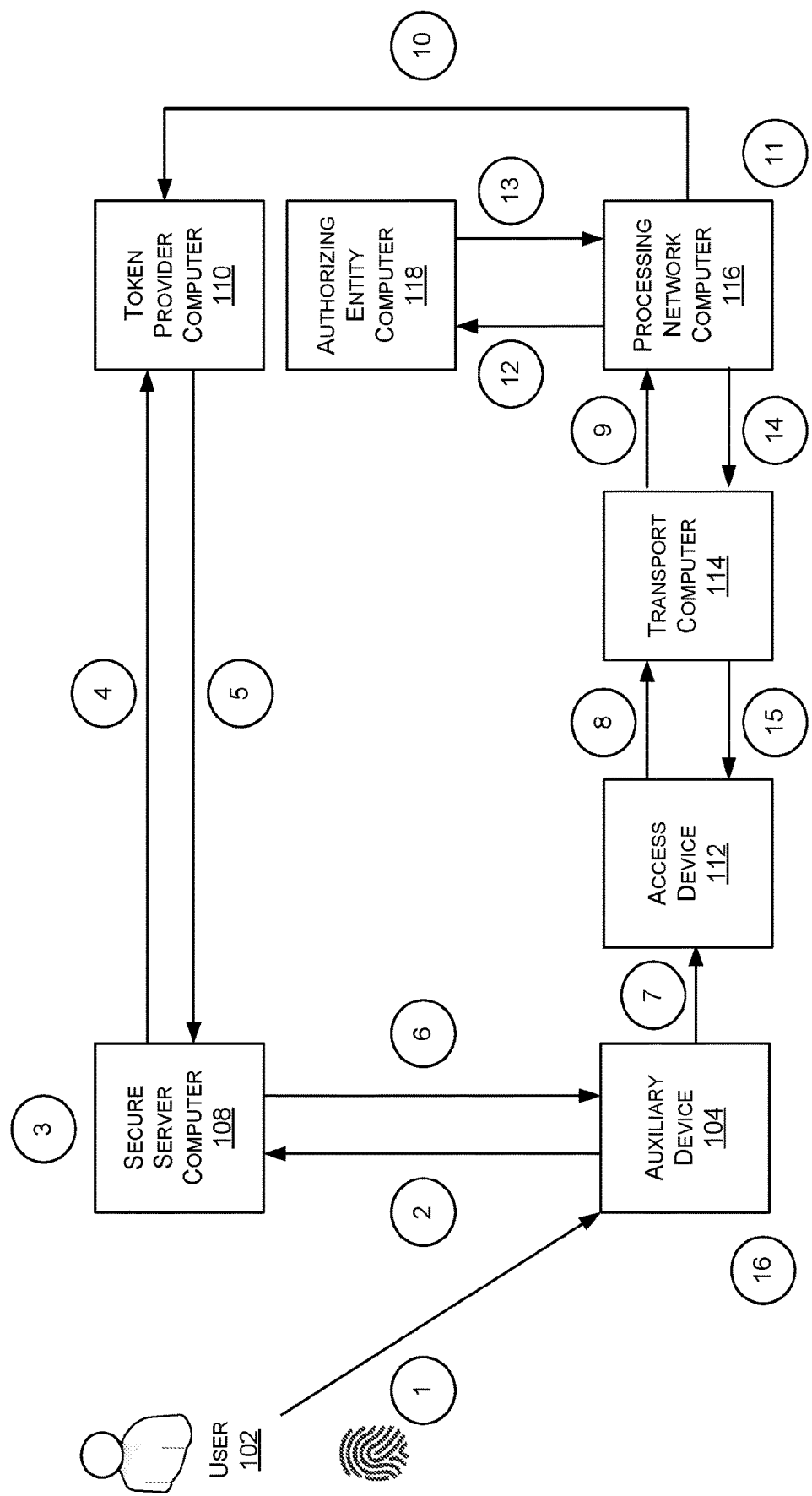
FIG. 9 shows an exemplary system and process flow diagram for performing a biometric enrollment process during a transaction, in accordance with at least one embodiment.

FIG. 9 shows an exemplary system 900 (e.g., the system 100 of FIG. 1) and process flow diagram for performing a biometric enrollment process during a transaction, in accordance with at least one embodiment. In some embodiments, a partner (e.g., a merchant different from a merchant associated with the access device 112) may provide a computing device (e.g. auxiliary device 104) for the user 102 to use in order to utilize an existing payment credential (e.g., a payment credential such as a payment card previously provided via a website hosted by the partner and stored at the secure server computer 108) for payments in a physical store (e.g., a store operated by the merchant associated with the access device 112).

At step 1, the user 102 may provide a credential associated with a user account managed by the secure server computer 108. For example, the user 102 may enter a username and password, a PIN, or any suitable credential associated with the user account. Additionally, the user 102 may provide biometric data at a biometric device (e.g., a biometric scanner, a biometric reader, etc.) of the auxiliary device 104 (e.g., or a biometric device in communication with the auxiliary device 104). By way of example, the user 102 may provider his fingerprint via a fingerprint scanner of the auxiliary device 104. As another example, the user 102 may utilize a camera of the auxiliary device 104 to provide an image of his face.

At step 2, the auxiliary device 104 may transmit an enrollment request including the credential and the biometric data to the secure server computer 108 for enrollment.

The credential and biometric data may be transmitted via any suitable message (e.g., an enrollment request message) of any suitable format.

At step 3, the secure server computer 108 may authenticate the user 102 by comparing the credential to previously stored credentials (e.g., credentials associated with the user's account and previously provided at a partner website). If the credentials provided do not match the previously stored credentials, the enrollment request may be denied and the user 102 may be notified (e.g., via the auxiliary device 104) that the enrollment failed. If the credentials received match the previously stored credentials, the secure server computer 108 may associate the biometric data with the user account and/or credentials.

Steps 4-16 of FIG. 9 substantially match steps 4-16 discussed in connection with FIG. 1 and will not be repeated here for brevity.

Figure 10:
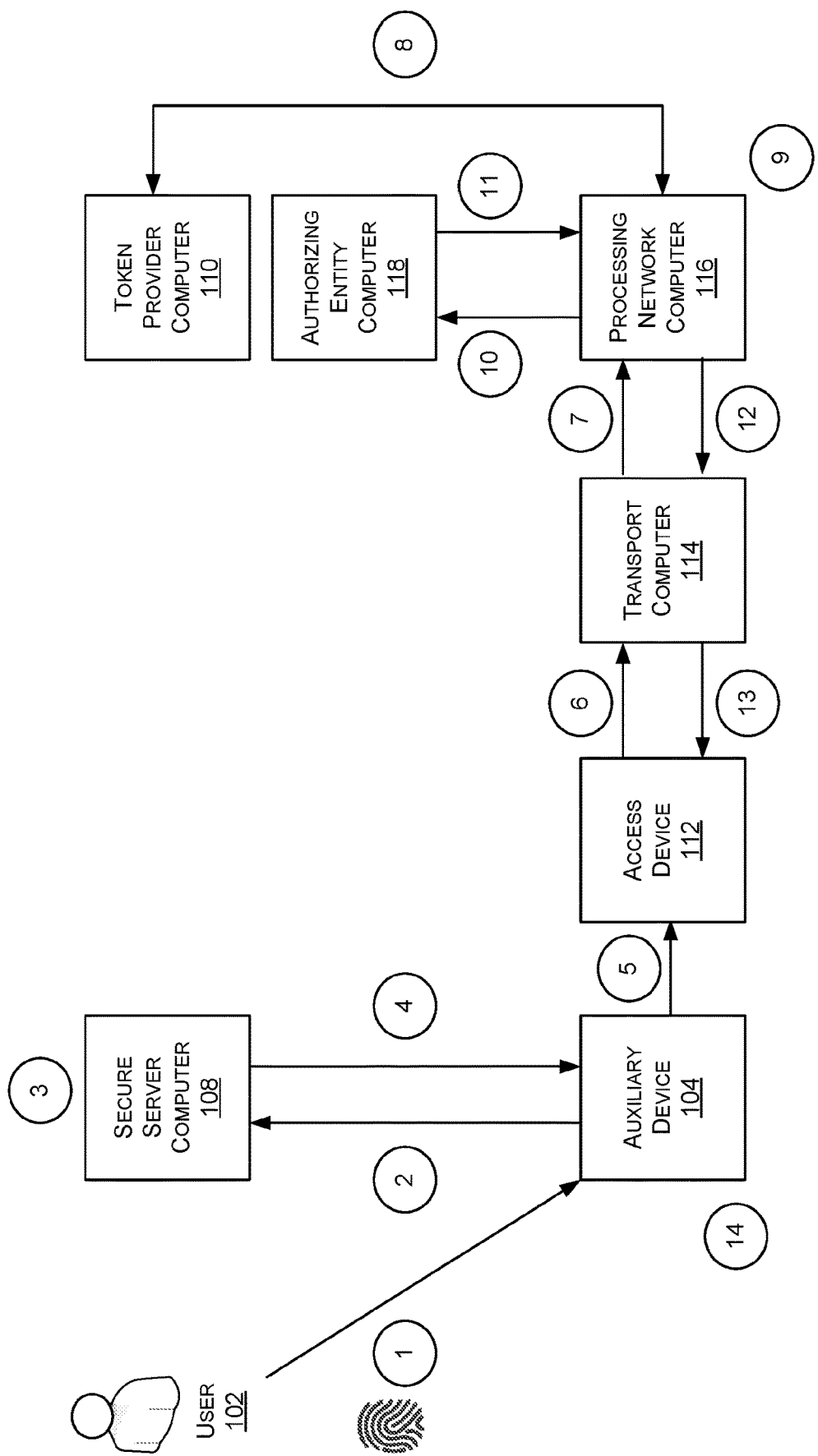
FIG. 10 shows an exemplary process flow diagram for performing a transaction utilizing biometric data associated with a user, in accordance with at least one embodiments.

FIG. 10 shows a system 1000 (e.g., the system 100 of FIG. 1) and an exemplary process flow diagram for performing a transaction utilizing biometric data associated with a user, in accordance with at least one embodiments. In some embodiments, the user 102 may walk into a partner's store and initiate a transaction. For example, the user 102 may select a number of items and an agent of the partner may scan the items to obtain a total amount owed by the user 102 to the partner. The total amount may include a total price for the items plus any suitable taxes and/or fees. The process flow described in connection with FIG. 10 may be utilized by the user 102 to provide payment for the transaction.

At step 1, the user 102 may authenticate himself using biometric data provided at a biometric device (e.g., a biometric scanner, a biometric reader, etc.) of the auxiliary device 104 (e.g., or a biometric device in communication with the auxiliary device 104). By way of example, the user 102 may provider his fingerprint via a fingerprint scanner of the auxiliary device 104. As another example, the user 102 may utilize a camera of the auxiliary device 104 to provide an image of his face.

At step 2, the auxiliary device 104 may transmit a token request (e.g., a token request message) to request a token and a cryptogram (e.g., a TAW). In some embodiments, the token request may include the biometric data obtained at step 1. In some embodiments, the biometric data may be transmitted first to the secure server computer 108 via another message (e.g., a validation request message) prior to the transmission of the token request. In some embodiments, the biometric data may be authenticated prior to token operations. The biometric data may be transmitted via any suitable message format. In some embodiments, the biometric data may be provided in a request for a token transmitted to the secure server computer 108.

Although not depicted, it should be appreciated that, in some embodiments, the auxiliary device 104 may store biometric data of the user 102 previously provided to the secure server computer 108. If so, the auxiliary device 104 may authenticate the user 102 by comparing the received biometric data to the biometric data stored at the auxiliary device 104 and associated with the user 102. In these examples, the biometric data may not be sent to the secure server computer 108.

At step 3, the secure server computer 108 may authenticate the user 102 by comparing the received biometric data to previously stored biometric data. If the credentials provided do not match the previously stored credentials, the token request may be denied and the user 102 may be notified (e.g., via the auxiliary device 104) that the transaction failed. If the credentials received match the previously stored credentials, the process may proceed to step 4.

At step 4, the secure server computer 108 may transmit the token and a cryptogram (e.g., a TAVV) to the auxiliary device 104 in response to authenticating the biometric identity of the user 102.

Steps 5-14 of FIG. 9 substantially match steps 7-16 discussed in connection with FIG. 1 and will not be repeated here for brevity.

Figure 11:
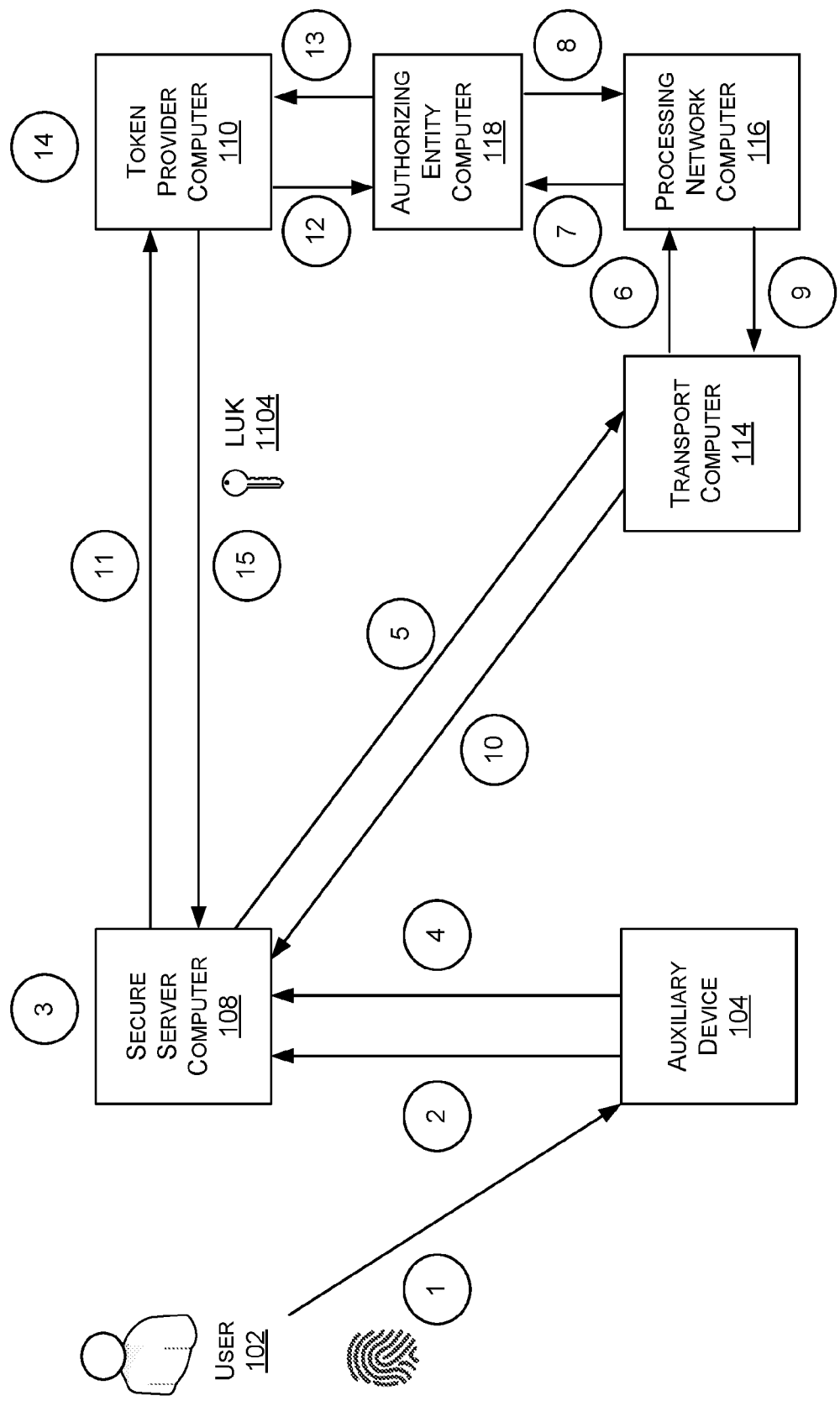
FIG. 11 shows an exemplary system and process flow diagram illustrating a limited-use key provisioning process, according to some embodiments.

FIG. 11 shows an exemplary system 1100 and process flow diagram illustrating a limited-use key provisioning process, according to some embodiments. The computers of FIG. 11 may be examples of the corresponding computers of FIG. 1.

In some embodiments, the user 102 may walk into a partner's store and initiate a transaction. For example, the user 102 may select a number of items and an agent of the partner may scan the items to obtain a total amount owed by the user 102 to the partner. The total amount may include a total price for the items plus any suitable taxes and/or fees. The process flow described in connection with FIG. 10 may be utilized by the user 102 to provide payment for the transaction.

Steps 1-4 of FIG. 11 may correspond to steps 1-4 of FIG. 8. That is, a process for providing biometric data and a credential may be performed in order to create a user account and to generate and maintain a mapping between the user 102, the biometric data and the credential.

At step 5, the secure server computer 108 may be configured to generate an authorization request message that includes zero amount. The authorization may be transmitted to the transport computer 114.

At step 6, the transport computer 114 may transmit the zero amount authorization request message to the processing network computer 116.

At step 7, the processing network computer 116 may transmit the zero amount authorization request message to the authorizing entity computer 118. Upon receipt, the authorizing entity computer 118 may determine whether to approve or decline the authorization request message. In some embodiments, a zero amount authorization request message may be considered by the authorizing entity computer 118 to be an indication that the user has provided biometric data. The authorizing entity computer 118 may be configured to perform any suitable authentication of the user 102 based at least in part on the data provided in the authorization request message.

At step 8, the authorizing entity computer 118 may generate an authorization response message indicating that the request was approved or declined. The authorization response message may also include a zero amount. The authorizing entity computer 118 may transmit the authorization response message to the processing network computer 116.

At step 9, the processing network computer 116 may transmit the zero amount authorization response message to the transport computer 114.

At step 10, the transport computer 114 may transmit the zero amount authorization response message to the secure server computer 108. The secure server computer 108 may determine that the authorization response message indicates that the authorization request was authorized (e.g., indicating that the user 102 was authenticated).

At step 11, the secure server computer 108 may transmit a token request (e.g., via a token request message) to the token provider computer 110. In some embodiments, the token request message may indicate a particular type of data.

For example, the token request message may indicate a request for a cryptographic key (e.g., a limited-use key).

At step 12, the token provider computer 110 may perform an eligibility check. By way of example, the token provider computer 110 may transmit a message (e.g., a token request message or any suitable message) to the authorizing entity computer 118 to check for the issuer's participation and/or to request tokenization. In some embodiments, the token provider computer 110 may request approval to generate the token (e.g., a cryptographic key such as a limited-use key) from the authorizing entity computer 118 without performing identification and/or verification of the user 102. Accordingly, in some embodiments, the token provider computer 110 may rely on authentication efforts and/or an assertion that the user 102 has been authentication as provided by the secure server computer 108.

At step 13, the authorizing entity computer 118 may use the data received at step 12 to determine whether to approve or decline the token request. The authorizing entity computer 118 may transmit a response (e.g., a token response message or any suitable message) to the token provider computer 110 indicating the request has been approved or declined.

If the request is approved, the token provider computer 110 may be configured to generate a limited-use key (LUK 1104) and a token (e.g., a token for the credential/payment data) at step 14. By way of example, in some embodiments, the token provider computer 110 may implement a set of key management functions that manages issuer master derivation keys (MDKs) from which the limited-use keys (LUKs) for cloud-based transactions are derived. In some embodiments, the token provider computer 110 may use a master derivation key (MDK) associated with issuer (e.g., the issuer associated with the authorizing entity computer 118) to generate the LUK 1104. In some embodiments, authorizing entity computer 118 may provide the token provider computer 110 with the issuer's MDK if the MDK is maintained or managed by authorizing entity computer 118, or authorizing entity computer 118 may generate the LUK 1104 and provide the token provider computer 110 with the LUK 1104. In either case, the LUK 1104 can be generated based on a key index (e.g., a counter) that acts as a seed for the generation of the LUK, and the key index can be shared between token provider computer 110 and the authorizing entity computer 118 to facilitate processing of transactions using the LUK. The token provider computer 110 (and/or the authorizing entity computer 118) may maintain and enforce a number of limited-use threshold that limit usage of the LUK 1104 (e.g., for a threshold time period, for a threshold number of transactions, etc.). In some embodiments, once the usage of the LUK 1104 has exhausted or exceeded the set of one or more limited-use thresholds, a further transaction conducted using that LUK 1104 will be declined even if the underlying account is still in good standing. The set of one or more limited-use thresholds to enforce can be determined, for example, by an issuer of the account (and provided in the token response message from the authorizing entity computer 118) or by the token provider computer 110.

The set of one or more limited-use thresholds may include at least one of a time-to-live indicating the duration of time for which the LUK 1104 is valid, a predetermined number of transactions for which the LUK 1104 is valid, and/or a cumulative transaction amount indicating the total transaction amount summed across one or more transactions for which the LUK 1104 is valid, or any combination thereof. For example, the LUK 1104 may be valid for a time-to-live of five days, and a transaction conducted using that LUK 1104 after five days have elapsed since the LUK 1104 was generated may be declined. As another example, a LUK 1104 may be valid for a predetermined number of five transactions, and a sixth transaction (and any subsequent transaction) conducted using that LUK 1104 may be declined. As a further example, a LUK 1104 may be valid for a cumulative transaction amount of five hundred dollars, and a transaction conducted using the LUK 1104 after that LUK 1104 has already been used for transactions totaling more than five hundred dollars may be declined.

It should be understood that the limited usage values described above are just examples, and that other usage limits can be used. For example, the number of transactions usage limit can be set to a number in the range of 2 to 10 transactions, or a number in the range of 5 to 50 transactions, etc., and the cumulative transaction amount can be set to a value in the range of $100 to $5,000, or a value in the range of $10 to $1000, etc.

It should also be noted that in some embodiments, the number of transactions limited-use threshold can be set to one transaction such each LUK 1104 is valid for only one transaction. However, in some embodiments, the network bandwidth available to a portable communication device may be limited, or the portable communication device may not always have uninterrupted network connectivity. As such, the number of transactions limited-use threshold can be set to more than one transaction (e.g., five transactions) in some embodiments, for example, to reduce the frequency and amount of LUK replenishments over time, and hence reduce the amount of network traffic used by the portable communication device over time.

In some embodiments, the set of one or more limited-use thresholds may also include an international usage threshold and a domestic usage threshold indicating separate limits for international transactions versus domestic transactions. For example, the number of transactions that a LUK (e.g., the LUK 1104) may be valid for can be higher for domestic transactions than for international transactions, if international transactions are deemed to be more risky. The set of one or more limited-use thresholds may also include a low value transaction threshold and a high value transaction threshold indicating separate limits for low value transactions versus high value transactions. For example, the number of transactions that a LUK may be valid for can be higher for low value transactions (e.g., LUK valid for ten transactions under $20) than for high value transactions (e.g., LUK valid for five transactions over $20) such that low value transactions will trigger replenishment of the LUK less frequently than high value transactions.

In some embodiments, the set of one or more limited-use thresholds associated with an account may change when the LUK is replenished such that a new LUK replacing a previous LUK may have one or more different usage limits than the previous LUK. This may occur, for example, based on changes in the consumer spending habits, the location of the portable communication device, or the time of the year, etc. For example, a new LUK may have a higher usage limit if the user has a recent pattern of conducting many high value transactions, or when it is during the holiday season when transaction activity is expected to increase. As another example, a new LUK may have a lower usage limit if the location of the portable communication device indicates that the user may have traveled to a high risk country where fraud is prevalent.

In embodiments in which a LUK (e.g., LUK 1104) is associated with more than one limited-use thresholds, the usage of the LUK (e.g., LUK 1104) can be exhausted when any one of the limited-use thresholds is exceeded, or when some combination of the limited-use thresholds is exceeded. Hence, replenishment of the LUK may be triggered when any one of the limited-use thresholds is exceeded or is about to be exceeded, or when some combination of the limited-use thresholds is exceeded or is about to be exceeded.

At step 15, the token provider computer 110 may transmit the LUK 1104, the corresponding key index, and the generated token to the secure server computer 108 where the LUK 1104 and token may be stored. The LUK 1104 may be utilized (e.g., by the auxiliary device 104 of FIG. 12 or the secure element device 1302 of FIG. 3) during a transaction to calculate a transaction cryptogram or limited-use dynamic data such as a verification value to support transactions that use verification values (e.g., dynamic card verification value (dCVV)).

Figure 12:
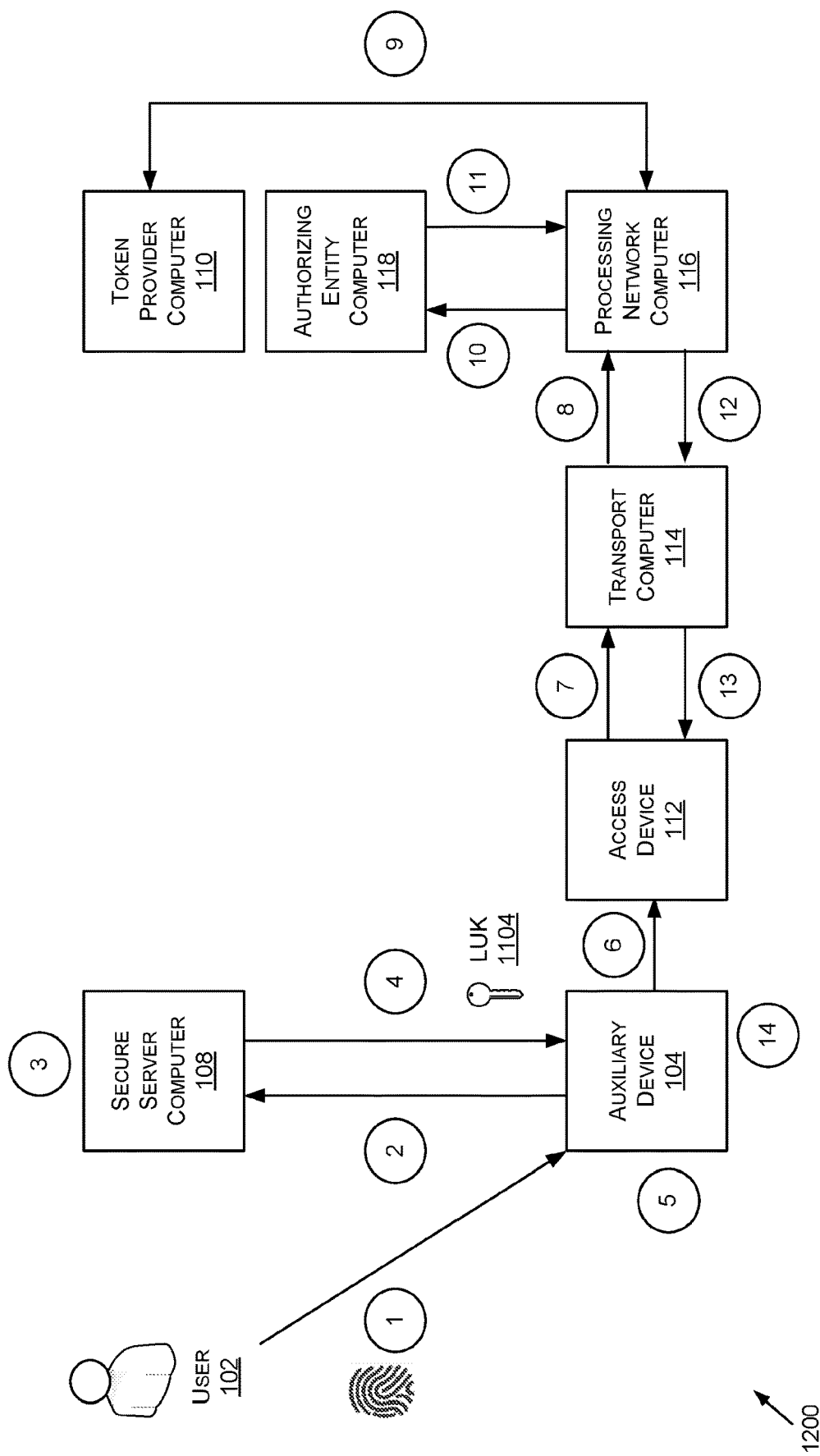
FIG. 12 shows an exemplary system and process flow diagram illustrating use case in which an auxiliary device is used to emulate a user device, according to some embodiments.

FIG. 12 shows an exemplary system 1200 and process flow diagram illustrating use case in which an auxiliary device is used to emulate a user device (e.g., a payment card), according to some embodiments. The computers of FIG. 12 may be examples of the corresponding computers of FIG. 1.

Embodiments depicted in FIG. 12 may identify and prevent a skimming attempts between the auxiliary device 104 and the access device 112. In some embodiments, the messages exchanged between the auxiliary device 104 and the access device 112 may be similar to the messages exchanged between a payment card and the access device 112, such that the auxiliary device may emulate a payment card. The auxiliary device 104 may act as an entry point for a transaction (e.g. the auxiliary device 104 retrieves the LUK 1104 of FIG. 11 from the secure server computer 108, initiates the transaction with the access device 112, etc.). The pickpocketing/skimming risk may originate during the transmission of the credentials (e.g. payment data, card data, account data) from the partner standalone device (e.g. the auxiliary device 104) to the access device 112 using a skimming device. Embodiments may prohibit out of band key sharing with the partner (neither Merchant's key nor Issuer Key). Embodiments may also prohibit additional storage of any variable from the processing network side.

In some embodiments, the user 102 may walk into a partner's store and initiate a transaction. For example, the user 102 may select a number of items and an agent of the partner may scan the items to obtain a total amount owed by the user 102 to the partner. The total amount may include a total price for the items plus any suitable taxes and/or fees. The process flow described in connection with FIG. 10 may be utilized by the user 102 to provide payment for the transaction. In some embodiments, the auxiliary device 104 (or an application operating on the auxiliary device 104) may communicate with the access device 112 using card emulation APIs of an operating system of the auxiliary device 104. Thus, a transaction can be carried out without requiring the use of a secure element (although a secure element can be used as described in FIG. 13).

At step 1, the user 102 may authenticate himself using biometric data provided at a biometric device (e.g., a biometric scanner, a biometric reader, etc.) of the auxiliary device 104 (e.g., or a biometric device in communication with the auxiliary device 104). By way of example, the user 102 may provider his fingerprint via a fingerprint scanner of the auxiliary device 104. As another example, the user 102 may utilize a camera of the auxiliary device 104 to provide an image of his face.

At step 2, the auxiliary device 104 may transmit a token request (e.g., a token request message) to request data such as the token, the LUK 1104, and the key index associated with the LUK 1104. In some embodiments, the token request may include the biometric data obtained at step 1.

At step 3, the secure server computer 108 may authenticate the user 102 by comparing the received biometric data to previously stored biometric data. If the received biometric data does not match previously provided biometric data, the token request may be denied and the user 102 may be notified (e.g., via the auxiliary device 104) that the transaction has failed. If the biometric data matches previously stored biometric data the process may proceed to step 4.

At step 4, the secure server computer 108 may transmit the token, the LUK 1104, and the corresponding key index to the auxiliary device 104 in response to authenticating the biometric identity of the user 102.

At step 5, the auxiliary device 104 may utilize the LUK to calculate a cryptogram (also referred to as an "interaction cryptogram") or limited-use dynamic data such as a verification value to support legacy transactions that use verification values (e.g., dynamic card verification value (dCVV)).

At step 6, the auxiliary device 104 transmit track-2 equivalent data and the cryptogram generated with the LUK to the access device 112. In some embodiments, the track-2 equivalent data may include an account identifier (e.g., the token), an expiry date, a service code, a PIN verification field, track-2 discretionary data, etc. In some embodiments, the LUK and the corresponding key index may be embedded in the track-2 discretionary data included in the authorization request message.

In some embodiments, the key index associated with the LUK may be the key index include information pertaining to the generation of the LUK as described herein. For example, the key index may be a seed that was used to generate the LUK, and may include time information (e.g., a timestamp) indicating when the LUK was generated, and/or may include a replenishment counter value indicating the number of times that the LUK has been renewed or replenished for a particular account, mobile application, or portable communication device. In some embodiments, the key index may include an application transaction counter value indicating the number of transactions that has been previously conducted by a mobile application of the portable communication device at the time the LUK is generated, or may include a pseudo random number generated by the token provider computer 110 or by a suitable entity such as an issuer involved in processing the transaction.

At step 7, the access device 112 may generate and send an authorization request message to the transport computer 114 operated by an acquirer. The authorization request message can include the track-2 equivalent data, the LUK, the key index, and the token.

At step 8, the transport computer 114 may transmit the authorization request message to the processing network computer 116.

At step 9, the processing network computer 116 may detokenize the token to obtain a real account identifier (e.g., a personal account number (PAN) associated with the token. In this regard, the processing network computer 116 may communicate with the token provider computer 110. For example, the processing network computer 116 may provide the token and the cryptogram to the token provider computer 110. The token provider computer 110 may verify that the token and the cryptogram are associated with one another. If so, the token provider computer 110 may respond with the real account identifier associated with the token and cryptogram.

At step 10, the processing network computer 116 may forward the authorization request message to the authorizing entity computer 118 (an issuer associated with the real account identifier. After authorizing entity computer 118 receives the authorization request message, the authorization request message may be parsed, and the information in the authorization request message may be verified. For example, authorizing entity computer 118 may verify that the transaction cryptogram was generated by a valid LUK, and that the set of one or more limited-use thresholds associated with the LUK has not been exceeded. In some embodiments, some or all of the information in the authorization request message can also be sent to the token provider computer 110 for verification and processing. For example, if authorizing entity computer 118 does not have the capability to verify the cryptogram, the processing network computer 116 and/or the authorizing entity computer 118 may forward the cryptogram to the token provider computer 110 for verification.

At step 11, the authorizing entity computer 118 can approve or decline the authorization request message and can transmit an authorization response message back to processing network computer 116.

At step 12, the processing network computer 116 may transmit the authorization response message to the transport computer 114.

At step 13, the transport computer 114 may transmit the authorization response message to the access device 112.

At step 14, the auxiliary device 104 can delete the token, the LUK 1104, the key index, and/or cryptogram from memory. It should be appreciated that this deletion can occur at any suitable time after performance of the operations of step 6. In some embodiments, the access device 112 can transmit an indication that the authorization response message of step 14 was received, which can cause the auxiliary device 104 to delete the token, the LUK 1104, the key index, and/or cryptogram from memory.

Figure 13:
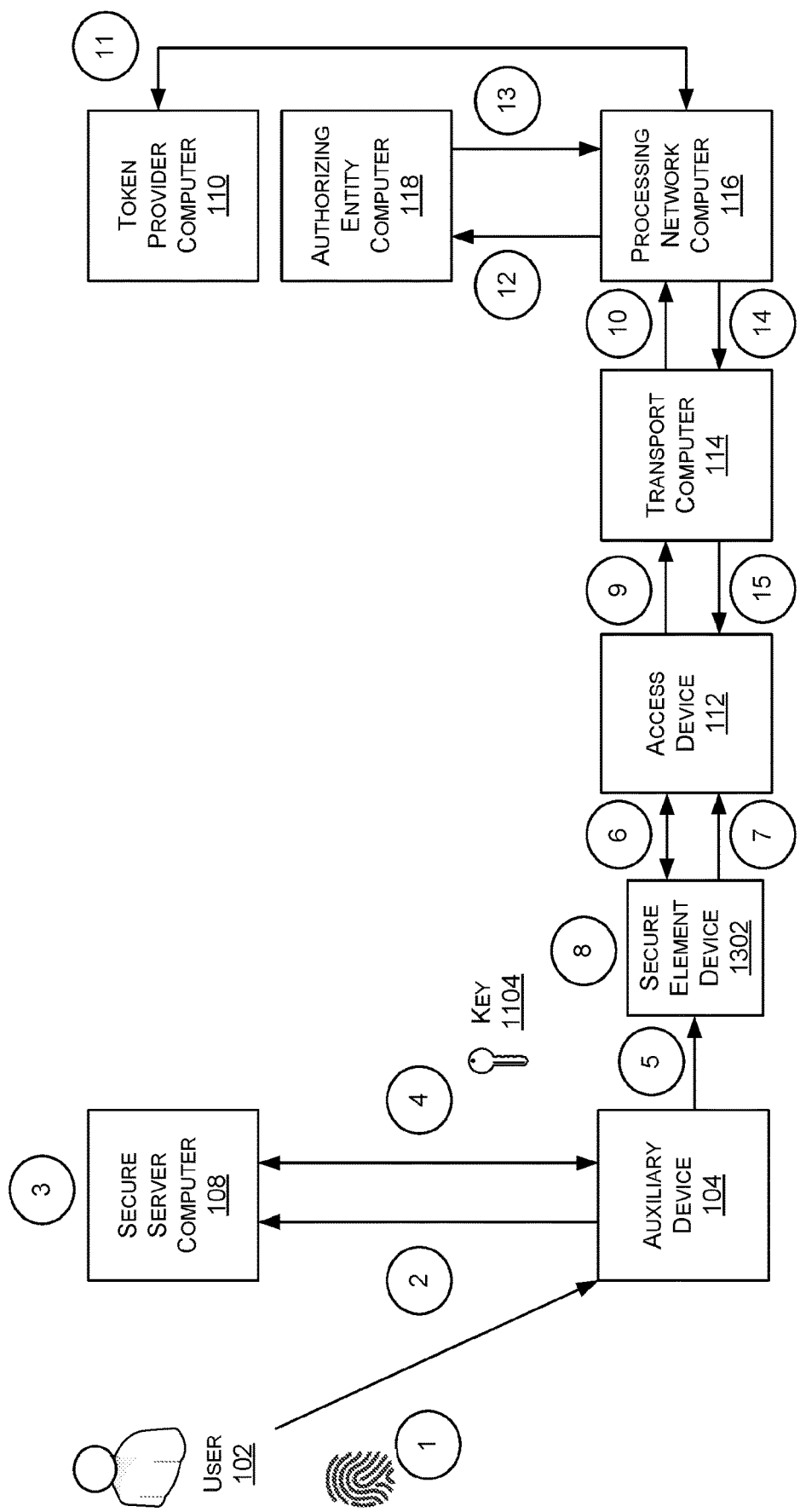
FIG. 13 shows an exemplary process flow diagram illustrating a use case in which secure element device is used to perform a transaction, according to some embodiments.

FIG. 13 shows an exemplary system 1300 and a process flow diagram illustrating a use case in which secure element device is used to perform a transaction, according to some embodiments. In some embodiments, a secure element device 1302 may be disposed between an auxiliary device 104 and an access device 112. In some embodiments, the secure element device 1302 may be configured to communicate with the auxiliary device 104 and/or the access device 112 via a short-range wireless communications protocol (e.g., Bluetooth®). The auxiliary device may provide the token and/or or any suitable data for generating a cryptogram to the secure element device. By way of example, a token, the LUK 1104, and a corresponding key index used to generate the LUK 1104 may be retrieved from the secure server computer 108 and provided to an auxiliary device 104. In some embodiments, the token, the LUK 1104, and the corresponding key index used to generate the LUK 1104 may be provided by the auxiliary device 104 to the secure element device 1302 where they may be stored (at least for a time). In some embodiments, the auxiliary device may further provide the secure element device 1302 additional transaction information (e.g., such as track-2 equivalent data). The secure element device 1302 may receive additional access device data (e.g., a terminal identifier, etc.). The remaining computers of FIG. 13 may be examples of the corresponding computers of FIG. 1.

Embodiments depicted in FIG. 13 may identify and prevent a skimming attempts between the secure element device 1302 and the access device 112. In some embodiments, the messages exchanged between the secure element device 1302 and the access device 112 may be similar to the messages exchanged between a payment card and the access device 112, such that the secure element device 1302 may emulate a payment card. The pickpocketing/skimming risk may originate during the transmission of data between the secure element device 1302 and the access device 112 using a skimming device.

In some embodiments, the user 102 may walk into a partner's store and initiate a transaction. For example, the user 102 may select a number of items and an agent of the partner may scan the items to obtain a total amount owed by the user 102 to the partner. The total amount may include a total price for the items plus any suitable taxes and/or fees. The process flow described in connection with FIG. 10 may be utilized by the user 102 to provide payment for the transaction.

At step 1, the user 102 may authenticate himself using biometric data provided at a biometric device (e.g., a biometric scanner, a biometric reader, etc.) of the auxiliary device 104 (e.g., or a biometric device in communication with the auxiliary device 104). By way of example, the user 102 may provider his fingerprint via a fingerprint scanner of the auxiliary device 104. As another example, the user 102 may utilize a camera of the auxiliary device 104 to provide an image of his face.

At step 2, the auxiliary device 104 may transmit a token request (e.g., a token request message) to request data such as the token, the LUK 1104, and the key index associated with the LUK 1104. In some embodiments, the token request may include the biometric data obtained at step 1.

At step 3, the secure server computer 108 may authenticate the user 102 by comparing the received biometric data to previously stored biometric data. If the received biometric data does not match previously provided biometric data, the token request may be denied and the user 102 may be notified (e.g., via the auxiliary device 104) that the transaction has failed. If the biometric data matches previously stored biometric data the process may proceed to step 4.

At step 4, the secure server computer 108 may transmit the token, the LUK 1104, and the corresponding key index to the auxiliary device 104 in response to authenticating the biometric identity of the user 102.

At step 5, the auxiliary device 104 may transmit the token, the LUK 1104, and the corresponding key index to the secure element device 1302.

At step 6, the secure element device 1302 may request and receive additional transaction data from the access device 112 (e.g., such as a terminal identifier, transaction data such as a total price, a merchant identifier, etc.).

At step 7, the secure element device 1302 may utilize the LUK 1104 to calculate a cryptogram (an interaction cryptogram) or limited-use dynamic data such as a verification value to support legacy transactions that use verification values (e.g., dynamic card verification value (dCVV)). The secure element device 1302 may transmit track-2 equivalent data and the cryptogram generated with the LUK 1104 to the access device 112. In some embodiments, the track-2 equivalent data may include an account identifier (e.g., the token), an expiry date, a service code, a PIN verification field, track-2 discretionary data, etc. In some embodiments, the LUK and the corresponding key index may be embedded in the track-2 discretionary data included in the authorization request message. In some embodiments, the key index associated with the LUK may be the key index include information pertaining to the generation of the LUK as described herein. For example, the key index may be a seed that was used to generate the LUK, and may include time information (e.g., a timestamp) indicating when the LUK was generated, and/or may include a replenishment counter value indicating the number of times that the LUK has been renewed or replenished for a particular account, mobile application, or portable communication device. In some embodiments, the key index may include an application transaction counter value indicating the number of transactions that has been previously conducted by a mobile application of the portable communication device at the time the LUK is generated, or may include a pseudo random number generated by the token provider computer 110 or by a suitable entity such as an issuer involved in processing the transaction.

At step 8, the secure element device 1302 may delete the token, the LUK 1104, and the key index from memory.

Steps 9-15 of FIG. 13 substantially match steps 7-13 of FIG. 12 and will not be repeated here for brevity.

Figure 14:
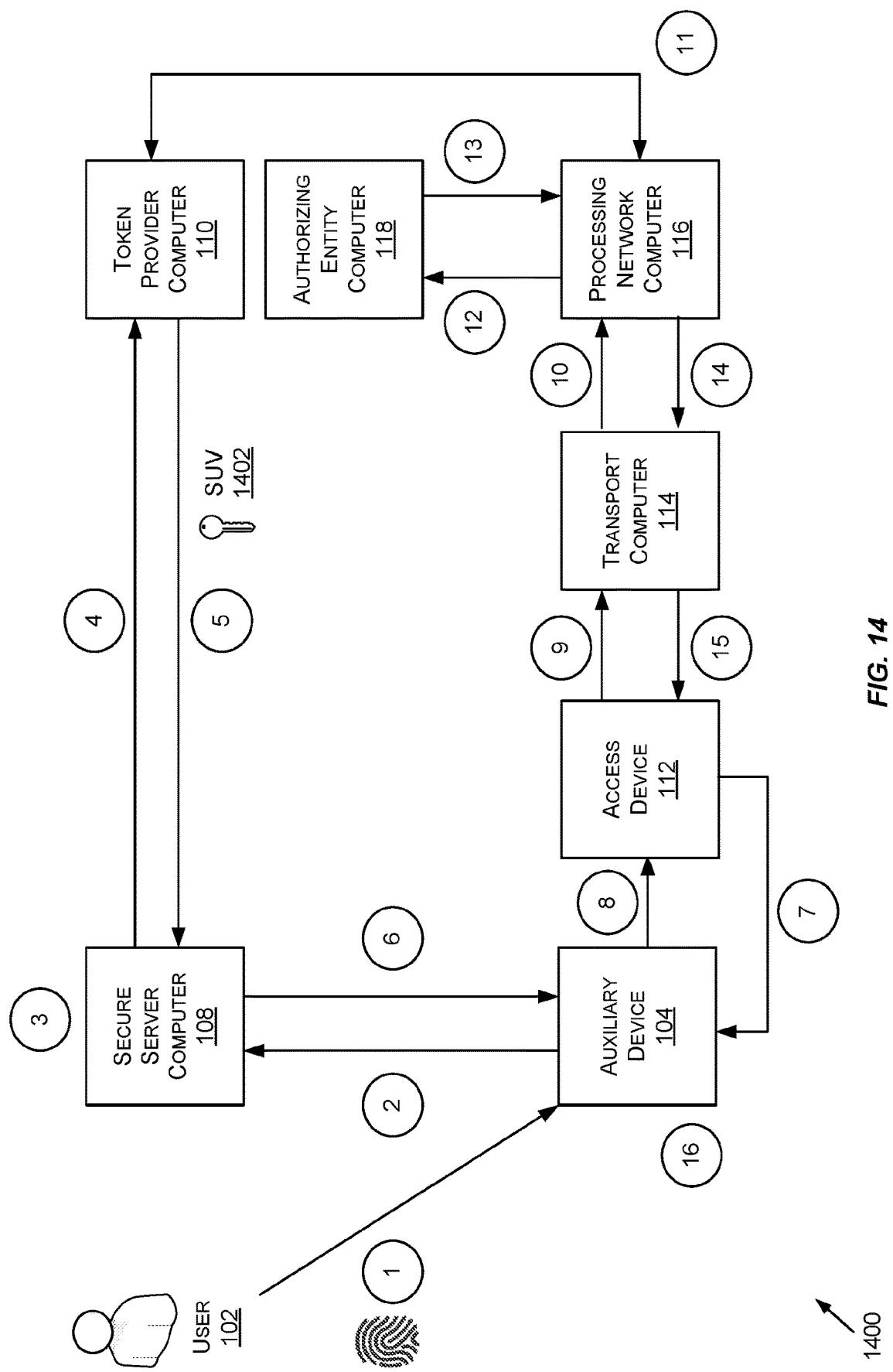
FIG. 14 shows an exemplary process flow diagram for utilizing a single use value for generating a cryptogram, according to at least on embodiment.

FIG. 14 shows an exemplary system 1400 and process flow diagram for utilizing a single use value to generate a cryptogram, according to at least on embodiment. In some embodiments, a single use value (e.g., a cryptographic key that is derived differently from a limited-use key) may be utilized to generate a cryptogram (e.g., an authorization request cryptogram, also referred to as an "ARQC"). FIG. 14 depicts a process for generating a cryptogram to prevent a pickpocketing/skimming risk at the partner level for transaction processing. In the example depicted in FIG. 14, the user 102 is presumed to have previously performed a biometric (authentication data) enrollment process that has already linked authentication data (e.g., biometric data) to a credential (e.g., a payment account identifier) associated with the user 102. Additionally, the secure server computer 108 is presumed to have previously requested a token for the credential from the token provider computer 110. The token may already be stored at the secure server computer 108 prior to the process depicted in FIG. 14.

At step 1, a user 102 may utilize the auxiliary device 104 to provide authentication data (e.g., a username/password, PIN, biometric data such as a fingerprint, a retina scan, an facial image). In some embodiments, the auxiliary device 104 may include one or more input devices configured to receive the authentication data. For example, the auxiliary device 104 may include a biometric reader, a camera, a retina scanner, and/or the like. The auxiliary device 104 may, in some cases, be provided by a partner (or a merchant) for interfacing with the partner's backend system (e.g., the secure server computer 108).

According to various embodiments, the auxiliary device 104 may be a biometric capable device that meets the security, functional, and/or biometric capture requirements defined by one or more of a token provider, a processing network, and/or an issuer. Generally, the auxiliary device 104 can be capable of capturing one or more of the biometric modalities (e.g. fingerprint, facial imprint, eye/retina scan, voice sample). The auxiliary device 104 may also protect (e.g., encrypt) and transmit the captured biometric data to the secure server computer 108 (e.g., for storage) and the auxiliary device 104 may protect (e.g., encrypt) cardholder data and payment credentials (PCI and PII data). In addition, some embodiments may use an existing POS to process payment transaction. For such embodiments, the auxiliary device 104 may include hardware capable of interacting with an access device 112 using any suitable communications protocol. Depending on the biometric modality or modalities, the hardware may also have additional sensors to detect the proximity of consumers in order to assist in determining whether, and which, consumer is intending to make a payment. Systems discussed in connection with various embodiments may also include client applications (e.g. application software) developed to run on the auxiliary device 104.

At step 2, the auxiliary device 104 may be utilized (e.g., via the client application) to provide the authentication data (e.g., the biometric data) to the secure server computer 108. In some embodiments, the authentication data may be encrypted by the auxiliary device 104 and decrypted by the secure server computer 108 (e.g., using a shared secret, etc.).

At step 3, the secure server computer 108 compare the received authentication data (e.g., the biometric data) to previously stored authentication data (e.g., biometric data associated with the user 102). If the received authentication data matches previously stored authentication data associated with the user 102, the process may proceed to step 4. Otherwise, the user 102 may be notified (e.g., via the auxiliary device 104) that the authentication has failed.

At step 4, the secure server computer 108 may request payment data by calling the token provider computer 110 using a dedicated application programming interface (e.g., a GetPaymentData API). The token provider computer 110 may be configured to generate a transaction authentication verification value (TAW) and a single use value (SUV) (e.g., an encryption key, SUV 1402) based at least in part on receiving a request via the dedicated API. The token provider computer 110 (or another suitable component of system 1400) may derive SUV 1402 from a Unique Derivation Key (UDK) (e.g., associated with an issuer) and a transaction counter. In some embodiments, the token provider computer 110 may include, or be in communication with a hardware security module (HSM) (not depicted) within which the SUV may be derived.

At step 5, the token server 306 may send a TAW, a token expiry date associated with the token (e.g., the token already stored at the secure server computer 108), and the SUV to the secure server computer 108. The secure server computer 108 may store the TAVV and the SUV in memory for subsequent use.

At step 6, the secure server computer 108 sends the token, the TAW, a token expiry date, and SUV 1402 to the auxiliary device 104.

At step 7, the auxiliary device 104 may receive at least an unpredictable number from the access device 112. The unpredictable number may be received in command data of a particular message such as a GPO (Get Processing Options) command message.

At step 8, the auxiliary device 104 may compute a hash value of dynamic data (e.g., the unpredictable number and the SUV 1402) and transmit some portion of the hash value to the access device 112. In some embodiments, the auxiliary device 104 may compute the hash value by extracting the unpredictable number (UN) from the command data (e.g. the last 4 bytes of the command data). Once extracted, the unpredictable number may be concatenated with the SUV 1402. The concatenated value may be utilized as input into a hashing algorithm to generate a hash value. In some embodiments, the auxiliary device 104 may be configured to utilize only a portion of the calculated hash value as an authorization request cryptogram (ARQC). By way of example, the auxiliary device 104 may extract the leading 8 bytes of the hash value and utilize those 8 bytes as an ARQC. The auxiliary device 104 may transmit any suitable combination of the token, the transaction counter, the ARQC, the unpredictable number, and transaction data to the access device 112 at step 8.

At step 9, the access device 112 may generate an authorization request message including the token, the transaction counter, the ARQC, the unpredictable number, and transaction data. The access device 112 may transmit the authorization request message to the transport computer 114.

At step 10, the transport computer 114 may transmit the authorization request message including the ARQC and other information to the processing network computer 116. According to various embodiments, the token provider computer 110 and the processing network computer 116 may be managed by or integrated with a same entity (e.g., a payment processor).

At step 11, the processing network computer 116 may retrieve the SUV 1402 (e.g., from the token provider computer 110) and may compute the hash value in the manner described above in connection with step 8. In some embodiments, the processing network computer 116 may provide the transaction counter to the token provider computer 110. The token provider computer 110 may increment and store the counter such that the next single use value may be derived using a different counter value (thus ensuring uniqueness between single use values). The processing network computer 116 may compare a portion of the computed hash value (e.g., the computed ARQC) with the ARQC received in the authorization request message. If the values match, the process may proceed to step 12. Otherwise, the authorization request message may be declined. In some embodiments, the processing network computer 116 may perform a conversion from a first transaction data format to a second transaction data format as discussed above in connection with FIG. 1 prior to step 12.

At step 12, the processing network computer 116 may transmit the authorization request message to the authorizing entity computer 118.

At step 13, the authorizing entity computer 118 can approve or decline the authorization request message and can transmit an authorization response message back to processing network computer 116. The authorization response message may be in any suitable format (e.g., the second transaction data format).

At step 14, the processing network computer 116 may transmit the authorization response message to the transport computer 114. It should be appreciated that, in some embodiments, the processing network computer 116 may convert the authorization response message from a second transaction data format to a first transaction data format prior to the transmission.

At step 15, the transport computer 114 may transmit the authorization response message to the access device 112.

At step 16, the auxiliary device 104 can delete the token, the SUV 1402, the token expiry date, and/or the ARQC from memory. It should be appreciated that this deletion can occur at any suitable time after performance of the operations of step 8. In some embodiments, the access device 112 can transmit an indication that the authorization response message of step 15 was received, which can cause the auxiliary device 104 to delete this data from memory.

By utilizing the single use key and an unpredictable number from the access device 112 to derive unique ARQCs, the system 1400 can protect against replay and relay attacks.

Figure 15:
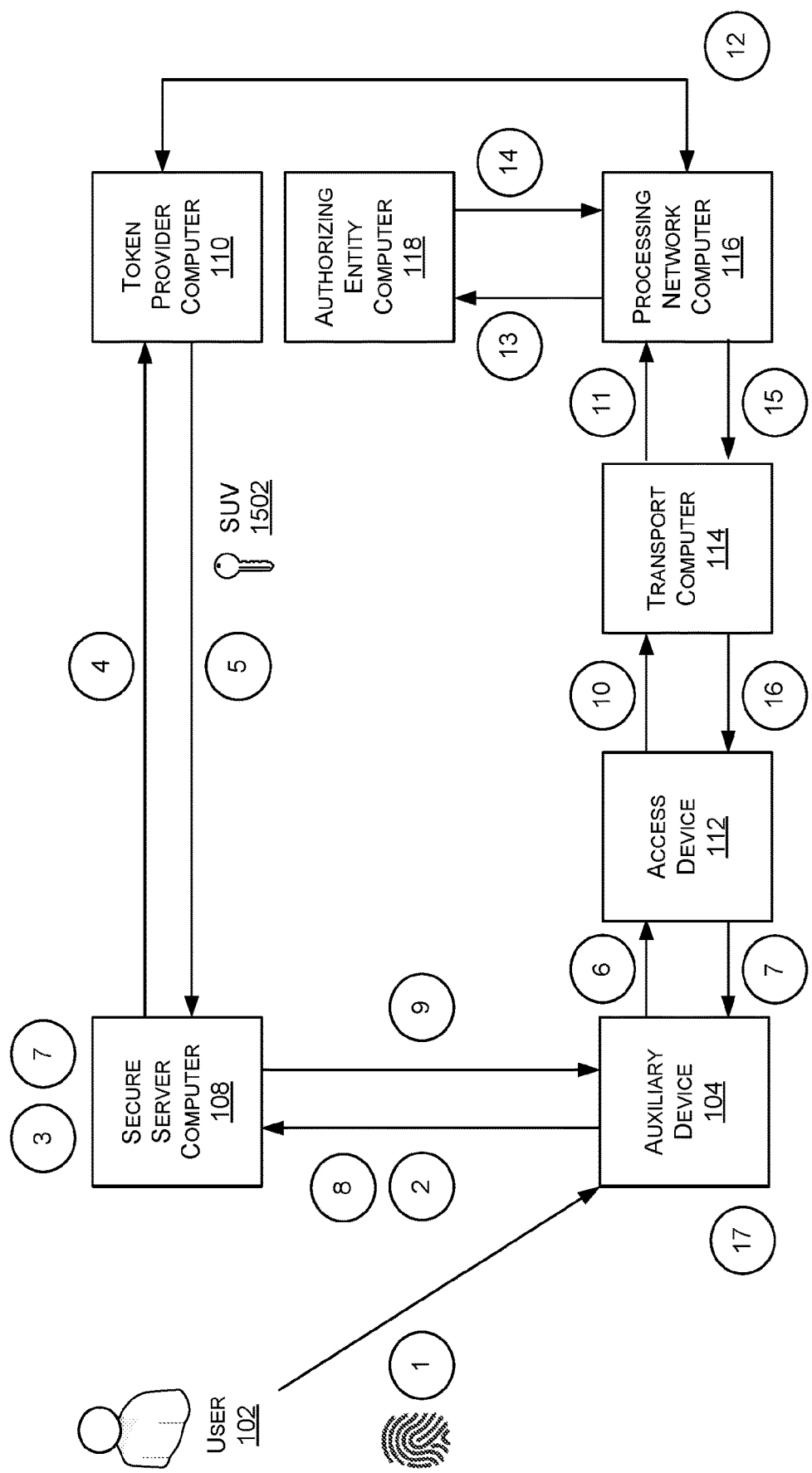
FIG. 15 shows an exemplary process flow diagram for utilizing a single use value for generating a cryptogram, according to at least on embodiment.

FIG. 15 shows another exemplary system 1500 and process flow diagram for utilizing a single use value to generate a cryptogram, according to at least on embodiment. In the example depicted in FIG. 15, the user 102 is presumed to have previously performed a biometric (authentication data) enrollment process that has already linked authentication data (e.g., biometric data) to a credential (e.g., a payment account identifier) associated with the user 102. Additionally, the secure server computer 108 is presumed to have previously requested a token for the credential from the token provider computer 110. The token may already be stored at the secure server computer 108 prior to the process depicted in FIG. 15. Steps 1-3 of FIG. 15 are substantially similar to steps 1-3 of FIG. 14 and will not be repeated here for brevity.

At step 4, the secure server computer 108 (e.g. a backend server for the partner, the token requestor) sends a request (e.g., via a dedicated API, via a specific message such as an encryption key request message) to the token provider computer 110 requesting an encryption key. The request may include, among other things, the token associated with the credential of user 102 and an application transaction counter (ATC)). According to some embodiments, the secure server computer 108 may track the ATC as the credential is utilized for transaction over time.

At step 5, the token provider computer 110 may derive a single use key (SUK) (e.g., SUK 1502). In some embodiments, the SUK may be derived in a hardware security module (HSM) of the token provider computer 110 (not depicted). According to various embodiments, SUK 1502 may be derived from a Unique Derivation Key (UDK) associated with the issuer and the ATC provided by the secure server computer 108. The token provider computer 110 may transmit the SUK 1502 to the secure server computer 108 (e.g., via an encryption key response message). The secure server computer 108 may store the SUK 1502 for subsequent use. In some embodiments, the secure server computer 108 can pre-fetch SUKs ahead of time. For example, multiple SUKs can be obtained and stored at the secure server computer 108. The process for obtaining multiple SUKs may be substantially similar to the process for obtaining multiple cryptograms discussed in connection with FIG. 7.

At step 6, the auxiliary device 104 in communication with the access device 112 may send a request for payment details to the access device 112. The access device 112 may respond with an unpredictable number, among other terminal data (e.g., transaction amount), at step 7.

At step 8, the auxiliary device 104 may transmit the data received from the access device 112 to the secure server computer 108 to request a cryptogram from the secure server computer 108.

At step 9, the secure server computer 108 may generate a cryptogram (e.g., an ARQC), using the SUK 1502, the token, the ATC, and the unpredictable number in the manner described above in connection with FIG. 14. In some embodiments, an ARQC may be generated using the SUK 1502, the token, the ATC, the unpredictable number, and a transaction amount provided by the access device 112. The secure server computer 108 may return the cryptogram to the auxiliary device 104.

Steps 10-17 of FIG. 15 are substantially similar to steps 9-16 of FIG. 14 and will not be repeated here for brevity.

It should be appreciated that, in the examples provided in FIGS. 1-15, data transmitted between any two components (e.g., any suitable combination of computers or devices) may be encrypted using a using a transport key (e.g. a symmetric transport key or an asymmetric transport key). For example, the transmitter of the data may encrypt the data using a symmetric transport key and the receiver of the data may utilize the symmetric transport key to decrypt. It should be appreciated that different transport keys may be utilized between each pair of devices in communication with one another.

Figure 16:
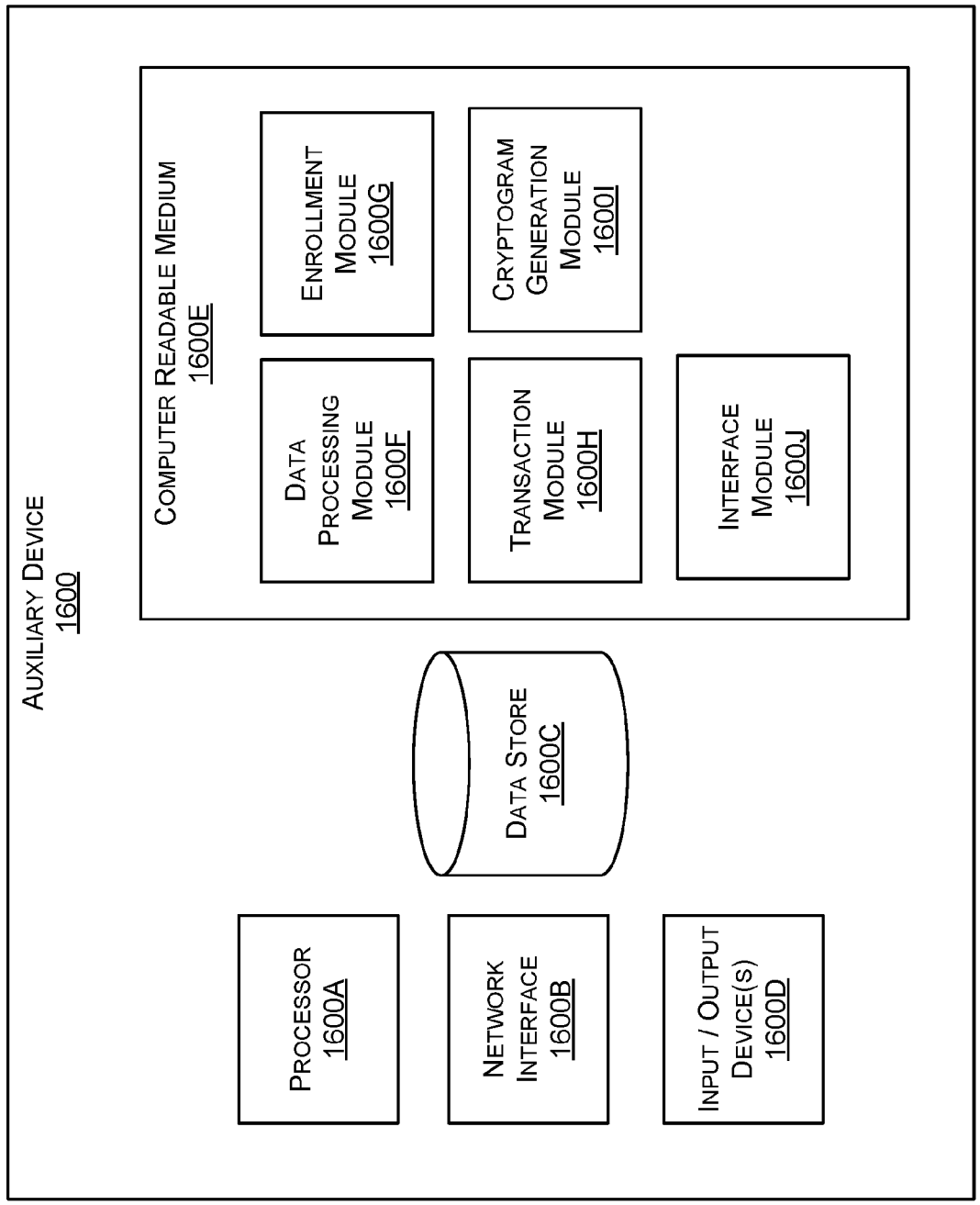
FIG. 16 shows an exemplary auxiliary device, in accordance with at least one embodiment.

FIG. 16 shows an exemplary auxiliary device 1600, in accordance with at least one embodiment. Auxiliary device 1600 may be an example of the auxiliary device 104 of the figures above. The auxiliary device 1600 may comprise a processor 1600A, a network interface 1600B, a data store 1600C, input/output devices 1600D, and a computer readable medium 1600E.

The network interface 1600B may be any suitable interface that enables the auxiliary device 1600 to communicate with access devices, secure server computers, secure element devices, and the like.

In some embodiments, the input/output devices 1600D may include a keyboard, touchpad, mouse, printer, biometric device(s) (e.g., biometric reader, retina scanner, fingerprint scanner, etc.).

The computer readable medium 1600E may comprise a data processing module 1600F, an enrollment module 1600G, a transaction module 1600H, a cryptogram generation module 1600I, and an interface module 1600J, and any other suitable software module. The computer readable medium 1600E may also comprise code, executable by the processor 1600A for implementing any of functions described herein with respect to an auxiliary device.

The data processing module 1600F may comprise code that causes the processor 1600A to process data. By way of example, the data processing module 1600F may be configured to cause the processor 1600A to receive any suitable data. By way of example, the data processing module 1600F may be configured to receive any suitable authentication data (e.g., username/password, biometric data, one-time passwords, etc.). In some embodiments, the data processing module 1600F may comprise code that causes the processor 1600A to compare received authentication data to stored authentication data (e.g., authentication data store in data store 1600C or obtained by the data processing module 1600F from another source accessible to the secure server computer 1700).

The enrollment module 1600G may comprise code that causes the processor 1600A to perform any suitable operations associated with an auxiliary device and discussed above in the enrollment processes of FIGS. 2, 8, and 9, for example.

The transaction module 1600H may comprise code that causes the processor 1600A to perform transaction. For example, the transaction module 1600H may contain logic that causes the processor 1600A to request authentication of a user via authentication data received from user input. The transaction module 1600H may be able request a token and/or a cryptogram from a remote system (e.g., the secure server computer 108 of FIG. 1). The transaction module 1600H may include code that, when executed, causes the processor 1600A to call code associated with the cryptogram generation module 1600I. The transaction module 1600H may include code that causes the processor 1600A to transmit data to a secure server computer, an access device, or a secure element device. In some embodiments, the transaction module 1600H may be configured to cause the processor 1600A to exchange data with an access device in a similar manner as a payment card. In some embodiments, the transaction module 1600H may be configured to cause the processor 1600A to transmit and/or receive data to/from a secure server computer and/or an access device.

In some embodiments, the cryptogram generation module 1600I may be configured to cause the processor 1600A to receive a limited-use key and/or a single key (e.g., from a secure server computer). The cryptogram generation module 1600I may be configured with code that may cause the processor 1600A to generate one or more cryptograms (e.g., an interaction cryptogram, an ARQC, etc.) utilizing at least a limited-use key or a single use key. For example, the cryptogram generation module 1600I may cause the processor 1600A to generate a cryptogram according to the methods discussed above in connection with FIGS. 12 and 14.

In some embodiments, the interface module 1600J may comprise code that causes the processor 1600A to provide one or more interfaces associated with the functions described above in connection with an auxiliary. By way of example, the interface module 1600J may provide interfaces for providing authentication data (e.g., a credential such as payment data, a one-time password, biometric data, or other suitable user input for enrollment or authentication purposes). The interface module 1600J may cause the processor 1600A to provide any suitable interface to enable the processor 1600A to perform the functions described above in connection with the FIGS. 1-15.

Figure 17:
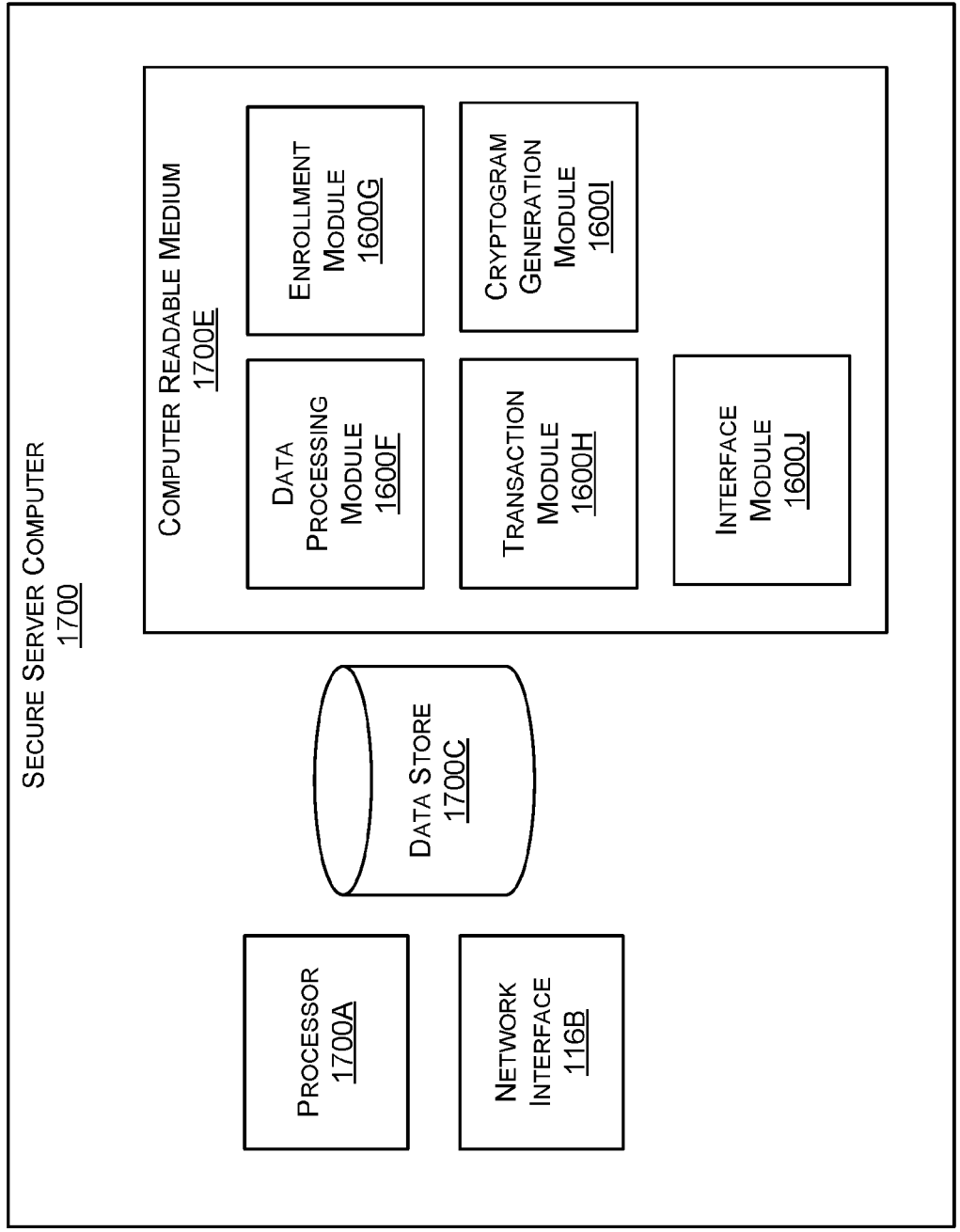
FIG. 17 shows an exemplary secure server computer, in accordance with at least one embodiment.

FIG. 17 shows an exemplary secure server computer, in accordance with at least one embodiment. Secure server computer 1700 may be an example of the secure server computer 108 of the figures above. The secure server computer 1700 may comprise a processor 1700A, a network interface 1700B, a data store 1700C, and a computer readable medium 1700E.

The data store 1700C may be configured to store one or more tokens, cryptograms, cryptographic keys (e.g., a limited-use key, a single use value, etc.), user account data, biometric data, authentication data, or any suitable data for performing the functions described above in connection with FIGS. 1-16.

The computer readable medium 1700E may comprise a data processing module 1700F, an enrollment module 1700G, a transaction module 1700H, a cryptogram generation module 1700I, and an interface module 1700J, and any other suitable software module. The computer readable medium 1700E may also comprise code, executable by the processor 1700A for implementing any of functions described herein with respect to a secure server computer.

The network interface 1700B may be any suitable interface that enables the secure server computer 1700 to communicate with auxiliary devices, token provider computers, and the like.

The data processing module 1700F may comprise code that causes the processor 1700A to process data. By way of example, the data processing module 1700F may be configured to cause the processor 1700A to receive any suitable data. By way of example, the data processing module 1700F may be configured to receive any suitable authentication data (e.g., username/password, biometric data, one-time passwords, etc.). In some embodiments, the data processing module 1700F may comprise code that causes the processor 1700A to compare received authentication data to stored authentication data (e.g., authentication data store in data store 1700C or obtained by the data processing module 1700F from another source accessible to the secure server computer 1700).

The enrollment module 1700G may comprise code that causes the processor 1600A to perform any suitable operations associated with a secure server computer and discussed above in the enrollment processes of FIGS. 2, 8, and 9, for example.

The transaction module 1700H may comprise code that causes the processor 1700A to perform transaction. For example, the transaction module 1700H may contain logic that causes the processor 1700A to request a token and/or a cryptogram from a remote system (e.g., the secure server computer 108 of FIG. 1). The transaction module 1700H may include code that, when executed, causes the processor 1700A to call code associated with the cryptogram generation module 1700I. In some embodiments, the transaction module 1700H may be configured to cause the processor 1700A to transmit and/or receive data to/from an auxiliary device and/or a token provider computer.

In some embodiments, the cryptogram generation module 1600I may be configured to cause the processor 1700A to receive a limited-use key and/or a single key (e.g., from a secure server computer). The cryptogram generation module 1600I may be configured with code that may cause the processor 1700A to generate one or more cryptograms (e.g., an interaction cryptogram, an ARQC, etc.) utilizing at least a limited-use key or a single use key. For example, the cryptogram generation module 1700I may cause the processor 1700A to generate a cryptogram according to the methods discussed above in connection with FIGS. 12 and 15.

In some embodiments, the interface module 1700J may comprise code that causes the processor 1700A to provide one or more interfaces associated with the functions described above in connection with a secure server computer. By way of example, the interface module 1700J may provide interfaces associated with an online website associated with a partner (e.g., an electronic marketplace provider, a merchant, etc.). These interfaces may enable the user to enter user account data (e.g., authentication data, payment data, etc.). The user account data may be stored in the data store 1700C for subsequent use (e.g., for authentication purposes, to retrieve payment data, etc.).

Figure 18:
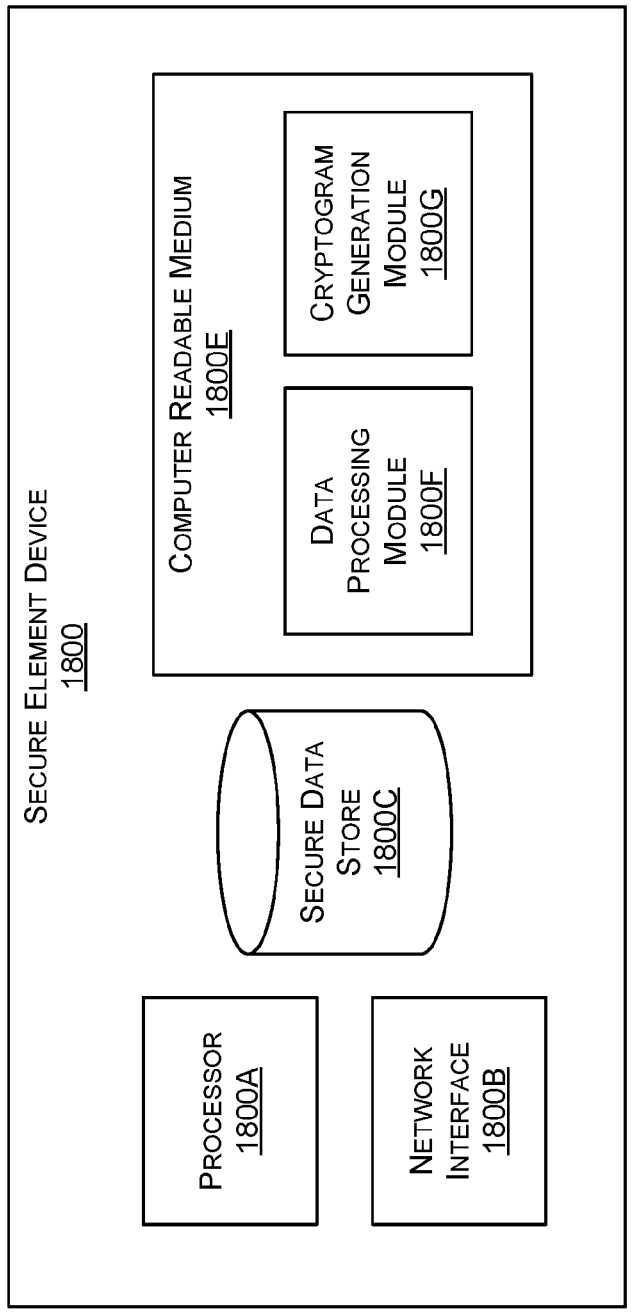
FIG. 18 shows an exemplary secure element, in accordance with at least one embodiment.

FIG. 18 shows an exemplary secure element device, in accordance with at least one embodiment. Secure element device 1800 may be an example of the secure element device 1302 of FIG. 13. The secure element device 1800 may comprise a processor 1800A, a network interface 1800B, a secure data store 1800C, and a computer readable medium 1800E.

The secure data store 1800C may be configured to store one or more tokens, cryptograms, cryptographic keys (e.g., a limited-use key, a single use value, etc.), transaction data, access device data, or any suitable data for performing the functions described above in connection with FIG. 13. Generally, any data for generating any cryptogram discussed above may be stored in the secure data store 1800C. Data stored in the secure data store 1800C may be encrypted or otherwise protected such that only the processor 1800A and/or the components of the secure element device 1800 may access the stored data.

The computer readable medium 1800E may comprise a data processing module 1800F and a cryptogram generation module 1800G, and any other suitable software module. The computer readable medium 1800E may also comprise code, executable by the processor 1800A for implementing any of functions described herein with respect to a secure element device.

The network interface 1800B may be any suitable interface that enables the secure element device 1800 to communicate with auxiliary devices, access devices, and the like.

The data processing module 1800F may comprise code that causes the processor 1800A to process data. By way of example, the data processing module 1800F may be configured to cause the processor 1800A to receive any suitable data such as transaction data, token data (e.g., a token, a token expiry date, etc.), one or more cryptographic keys (e.g., a limited-use key, a single use key, etc.). In some embodiments, the data processing module 1800F may comprise code that causes the processor 1800A to store the received data in the secure data store 1800C.

In some embodiments, the cryptogram generation module 1800G may be configured to cause the processor 1800A to receive a limited-use key and/or a single key (e.g., from an auxiliary device). The cryptogram generation module 1800G may be configured with code that may cause the processor 1800A to generate one or more cryptograms (e.g., an interaction cryptogram, an ARQC, etc.) utilizing at least a limited-use key or a single use key. For example, the cryptogram generation module 1800G may cause the processor 1800A to generate a cryptogram according to the methods discussed above in connection with FIGS. 12 and 15. In some embodiments, the generated cryptogram may be transmitted to an auxiliary device and/or an access device.

TECHNICAL ADVANTAGES

As provided above, a consumer may conduct a transaction using their credentials stored on the partner server (e.g., a secure server computer) by merely presenting their authentication data at a physical location (e.g., via an auxiliary device). For example, biometrics, and specifically biometrics that are not matched on the consumer's device, may provide a mechanism for a true seamless and potentially frictionless (in the case of modalities that do not require physical contact) interaction at a point of sale. Payment can occur without any need for a card, phone, wearable, or any other consumer device as long as the point of interaction is able to recognize the consumer and retrieve a credential that can be linked to that consumer. Embodiments discussed herein for match-in-cloud biometric solutions aids device manufacturers, software developers, payment service providers, merchants, and acquirers in providing a reliable, convenient, secure payment experience.

As discussed above, physical user device are often needed to conduct transaction at access device, but the need to carry a physical user device to access a resource at an access device can be cumbersome. Utilizing the techniques provided herein, a transaction may be conducted without the need of a physical user device, utilizing the systems discussed herein.

Furthermore, embodiments provide that existing legacy access devices may be utilized for transactions despite these devices lacking the capability of conducting transactions using token or credentials that originate from a source other than a user device. By utilizing the techniques disclosed herein, these legacy access devices can be used to perform a greater number of different types of transactions than would otherwise be available.

The techniques disclosed herein provide for a number of efficiency advantages. By way of example, traditionally, authentication requests and requests for tokens may be conducted utilizing processes and initiated using separate messages. Embodiments provide efficiency benefits by initiating both authentication and token procurement utilizing a single message. As another efficiency example, the ability to pre-fetch a number of cryptograms and stored those cryptograms for subsequent use enables transactions to be conducted quicker as a separate token request for each token would no longer be required. By utilizing previously obtained tokens stored at the secure server computer, each subsequent transaction may be performed in less time by retrieving the token from the secure server computer rather than requesting a new token upon each transaction.

Any of the computing devices described herein may be an example of a computer system that may be used to implement any of the entities or components described above. The subsystems of such a computer system may be are interconnected via a system bus. Additional subsystems include a printer, keyboard, storage device, and monitor, which is coupled to display adapter. Peripherals and input/output (I/O) devices, which couple to I/O controller, can be connected to the computer system by any number of means known in the art, such as a serial port. For example, I/O port or external interface can be used to connect the computer apparatus to a wide area network such as the Internet, a mouse input device, or a scanner. The interconnection via system bus may allow the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method, comprising:
   receiving, by an auxiliary device in communication with an access device, authentication data from a user;
   initiating, by the auxiliary device, verifying the authentication data;
   requesting, by the auxiliary device, a token from a secure server computer, wherein the token is a payment token;
   receiving, by the auxiliary device, the token and a transaction authentication verification value; and
   providing, by the auxiliary device, the token and the transaction authentication verification value to the access device, wherein the access device subsequently generates an authorization request message, wherein the authorization request message is a payment authorization request message, and wherein the method further comprises:
   receiving, by the auxiliary device from the secure server computer, an indication that the user has yet to be authenticated according to a supplementary authentication scheme;
   prompting, by the auxiliary device, the user for user input;
   receiving, by the auxiliary device, subsequent user input; and
   transmitting, by the auxiliary device, the subsequent user input to the secure server computer, wherein the secure server computer transmits the subsequent user input to a token provider computer, wherein the token provider computer is programmed to activate the token based at least in part on determining that the user has been authenticated according to the supplementary authentication scheme.

2. The method of claim 1, wherein requesting the token from the secure server computer causes the secure server computer to:
   generate a request for the token from the token provider computer, wherein the token provider computer generates a one-time password and provides the one-time password to an authorizing entity computer, which then provides the one-time password to a client device.

3. The method of claim 2, wherein the token provider computer activates the token in response to receiving, from the authorizing entity computer, an indication the user has been authenticated using the one-time password.

4. The method of claim 2, wherein the token provider computer activates the token based at least in part on determining that the subsequent user input matches the one-time password.

5. The method of claim 2, wherein the auxiliary device provides the token and the transaction authentication verification value to the access device in response to receiving an indication from the secure server computer that the user has been authenticated using the one-time password.

6. The method of claim 1, wherein requesting the token from the secure server computer causes the secure server computer to:
   generate a request for a plurality of cryptograms for transactions involving tokens;
   transmit the request to the token provider computer;
   receive the plurality of cryptograms; and
   store the plurality of cryptograms.

7. The method of claim 1, wherein the authentication data is biometric data of the user, and wherein verifying the authentication data comprises:
   transmitting, by the auxiliary device, the biometric data to the secure server computer; and
   receiving, by the auxiliary device, an indication that the biometric data was verified by the secure server computer, wherein the auxiliary device generates the authorization request message based at least in part on receiving the indication that the biometric data was verified by the secure server computer.

8. The method of claim 1, wherein the authorization request message is generated in a first data format, wherein the access device transmits the authorization request message to a processing network computer, the processing network computer converting the authorization request message from the first data format to a second data format.

9. The method of claim 1, wherein the access device is a POS system.

10. A method, comprising:
receiving, by an auxiliary device in communication with an access device, authentication data from a user;
initiating, by the auxiliary device, verifying the authentication data;
requesting, by the auxiliary device, a token from a secure server computer, wherein the token is a payment token;
receiving, by the auxiliary device, the token and a transaction authentication verification value; and
providing, by the auxiliary device, the token and the transaction authentication verification value to the access device, wherein the access device subsequently generates an authorization request message, wherein the authorization request message is a payment authorization request message, wherein the method further comprises:
receiving, by the auxiliary device from the secure server computer, a single use value, the secure server computer receiving the single use value from a token provider computer;
receiving, by the auxiliary device, an unpredictable value from the access device,
generating, by the auxiliary device, an authorization request cryptogram using the unpredictable value and the single use value, and
transmitting, by the auxiliary device, the authorization request cryptogram to the access device, wherein the access device generates the authorization request message to comprise the authorization request cryptogram and transmits the authorization request message to a payment processing network through an acquirer computer, wherein the payment processing network obtains the single use value from the token provider computer, computes a new cryptogram using the unpredictable value and the single use value, and processes the authorization request message if the new cryptogram matches the authorization request cryptogram.

11. An auxiliary device in communication with an access device, the auxiliary device comprising:
a processor; and
a computer readable medium coupled to the processor, the computer readable medium comprising code executable by the processor to cause the auxiliary device to:
receive authentication data associated with a user;
verify the authentication data;
request a token from a secure server computer, wherein the token is a payment token;
receive the token from the secure server computer;
obtain a verification value for the token; and
provide the token and the verification value to the access device, wherein the access device generates an authorization request message, wherein the authorization request message is a payment authorization request message, and wherein the computer readable medium further comprises code executable by the processor to:
receive, from the secure server computer, an indication that the user has yet to be authenticated according to a supplementary authentication scheme;
prompt the user for user input;
receive subsequent user input; and
transmit the subsequent user input to the secure server computer, wherein the secure server computer is programmed to transmit the subsequent user input to a token provider computer, which is programmed to activate the token based at least in part on determining that the user has been authenticated according to the supplementary authentication scheme.

12. The auxiliary device of claim 11, wherein the computer readable medium further comprises code, executable by the processor to further cause the auxiliary device to receive, with the token, a cryptogram of a plurality of cryptograms stored at the secure server computer, the plurality of cryptograms being requested and stored at the secure server computer in response to receiving the request for the token.

13. The auxiliary device of claim 11, wherein the computer readable medium further comprises code, executable by the processor to further cause the auxiliary device to provide payment credentials from the secure server computer, wherein the auxiliary device provides the payment credentials to the access device with the token and the verification value.

14. The auxiliary device of claim 11, wherein the computer readable medium further comprises code, executable by the processor to further cause the auxiliary device to:
identify that a one-time password authentication process is required;
prompt the user for a one-time password, the one-time password being communicated to the user utilizing a user device associated with the user; and
authenticate the user based at least in part on the one-time password.

15. The auxiliary device of claim 14, wherein the token is limited for use in a threshold number of transactions until the user is authenticated with the one-time password.

16. The auxiliary device of claim 11, wherein the computer readable medium further comprises code, executable by the processor to further cause the auxiliary device to:
obtain, from the secure server computer, a cryptographic key;
receive, from the access device, terminal data comprising an amount and an identifier; and
encrypt, by the auxiliary device, the terminal data utilizing the cryptographic key to generate an interaction cryptogram.

17. The auxiliary device of claim 16, wherein the interaction cryptogram is included in the authorization request message.

18. The auxiliary device of claim 16, wherein the cryptographic key is a limited use key.

19. The auxiliary device of claim 16, wherein the authorization request message is authorized based at least in part on verifying, by a remote server, the interaction cryptogram.

20. The auxiliary device of claim 16, wherein the verification value is a transaction authentication verification value.

* * * * *